(12) United States Patent
Greenbaum

(10) Patent No.: US 9,222,178 B2
(45) Date of Patent: Dec. 29, 2015

(54) ELECTROLYZER

(71) Applicant: GTA, Inc., Knoxville, TN (US)

(72) Inventor: Elias Stanley Greenbaum, Knoxville, TN (US)

(73) Assignee: GTA, INC., Knoxville, TN (US)

(*) Notice: Subject to any disclaimer, the term of this patent is extended or adjusted under 35 U.S.C. 154(b) by 0 days.

(21) Appl. No.: 14/667,453

(22) Filed: Mar. 24, 2015

(65) Prior Publication Data

US 2015/0197864 A1 Jul. 16, 2015

Related U.S. Application Data

(60) Continuation-in-part of application No. 14/514,152, filed on Oct. 14, 2014, now Pat. No. 9,017,529, which is a continuation of application No. 14/178,878, filed on Feb. 12, 2014, now Pat. No. 8,888,968, which is a division of application No. 13/747,238, filed on Jan. 22, 2013, now Pat. No. 8,808,512.

(51) Int. Cl.
*C25B 1/10* (2006.01)
*C25B 1/12* (2006.01)
(Continued)

(52) U.S. Cl.
CPC ... *C25B 1/10* (2013.01); *C25B 1/12* (2013.01); *C25B 9/00* (2013.01); *C25B 9/04* (2013.01);
(Continued)

(58) Field of Classification Search
CPC .............. C25B 9/04; C25B 9/08; C25B 9/10; C25B 1/10; C25B 1/12
See application file for complete search history.

(56) References Cited

U.S. PATENT DOCUMENTS

| | | | |
|---|---|---|---|
| 2,276,188 | A | 3/1942 | Greger |
| 3,379,634 | A | 4/1968 | Rutkowski |

(Continued)

FOREIGN PATENT DOCUMENTS

| | | | |
|---|---|---|---|
| CA | 302737 | A | 8/1930 |
| CA | 2819244 | A1 | 6/2012 |

(Continued)

OTHER PUBLICATIONS

Asbestos: Properties, Health Effects, and Hazard Management. http://web.archive.org/web/20111203170231/http://hseworld.net/en/sites/default/files/ASBESTOS.pdf; Dec. 3, 2011 (Saudi Aramco Environmental Protection), 12 pages.

(Continued)

*Primary Examiner* — Nicholas A Smith
(74) *Attorney, Agent, or Firm* — McDermott Will & Emery LLP

(57) ABSTRACT

The electrolytic production of high purity hydrogen and oxygen may include regulating gas pressure in the cathode and anode compartments of the electrolysis apparatus. The supply of water to the apparatus may be through at least one opening on the surface of the apparatus. High pressure hydrogen and oxygen gas may be produced without subjecting the electrolysis apparatus to large pressure differences between the interior and exterior of the apparatus. This may be accomplished by substantially immersing the entire electrolysis apparatus in a high pressure fluid thus making the interior and exterior pressures of the apparatus substantially equal. Two example structures for accomplishing this goal are disclosed. First, the apparatus may be placed in and encapsulated by a fluid-containing vessel that is itself pressurized. Second, the apparatus may be immersed in a deep water environment. Part of the electrical energy used to perform electrolysis may be recovered by capturing the kinetic energy and momentum in high pressure gas flowing in a tube, oxygen for example, and converting it to electricity by causing it to rotate an impeller that is coupled to an electric generator.

23 Claims, 42 Drawing Sheets

(51) Int. Cl.
*C25B 9/08* (2006.01)
*C25B 11/02* (2006.01)
*C25B 9/04* (2006.01)
*C25B 13/02* (2006.01)
*C25B 9/00* (2006.01)
*C02F 1/461* (2006.01)
*C25B 13/00* (2006.01)

(52) U.S. Cl.
CPC . *C25B 9/08* (2013.01); *C25B 11/02* (2013.01); *C25B 13/02* (2013.01); *C02F 1/46104* (2013.01); *C02F 2201/46115* (2013.01); *C25B 13/00* (2013.01); *Y02E 60/366* (2013.01); *Y10T 29/4911* (2015.01)

(56) References Cited

U.S. PATENT DOCUMENTS

| | | | |
|---|---|---|---|
| 3,554,893 A | 1/1971 | De Varda |
| 3,767,557 A | 10/1973 | Lamm |
| 3,855,104 A | 12/1974 | Messner |
| 3,976,550 A | 8/1976 | De Nora et al. |
| 4,014,776 A | 3/1977 | Giacopelli |
| 4,061,557 A | 12/1977 | Nishizawa et al. |
| 4,126,534 A | 11/1978 | Boulton |
| 4,178,517 A | 12/1979 | Salomon et al. |
| 4,206,030 A | 6/1980 | Santora |
| 4,229,277 A | 10/1980 | Specht |
| 4,250,002 A | 2/1981 | Lazarz et al. |
| 4,311,577 A | 1/1982 | Kircher |
| 4,340,452 A | 7/1982 | deNora |
| 4,357,543 A | 11/1982 | Penn |
| 4,367,134 A | 1/1983 | Kircher |
| 4,432,859 A | 2/1984 | Andreassen et al. |
| 4,437,963 A | 3/1984 | Yeoman |
| 4,443,708 A | 4/1984 | Lapeyre |
| 4,457,824 A | 7/1984 | Dempsey et al. |
| 4,474,612 A | 10/1984 | Lohrberg |
| 4,490,232 A | 12/1984 | Lapeyre |
| 4,541,911 A | 9/1985 | Burgess et al. |
| 4,615,783 A | 10/1986 | Staab |
| 4,627,897 A | 12/1986 | Tetzlaff et al. |
| 4,636,291 A | 1/1987 | Divisek et al. |
| 4,773,982 A | 9/1988 | Divisek et al. |
| 5,037,518 A | 8/1991 | Young et al. |
| 5,080,963 A | 1/1992 | Tatarchuk et al. |
| 5,130,006 A | 7/1992 | Oligny |
| 5,171,644 A | 12/1992 | Tsou et al. |
| RE34,233 E | 4/1993 | Bachot et al. |
| 5,211,828 A | 5/1993 | Shkarvand-Moghaddam |
| 5,599,430 A | 2/1997 | Pimlott et al. |
| 5,606,488 A | 2/1997 | Gustafson |
| 5,656,386 A * | 8/1997 | Scherer et al. | 429/494 |
| 5,660,698 A | 8/1997 | Scannell et al. |
| 5,728,485 A | 3/1998 | Watanabe et al. |
| 6,326,703 B1 | 12/2001 | Clark |
| 6,582,571 B2 | 6/2003 | Romine et al. |
| 6,759,757 B1 | 7/2004 | Campbell |
| 6,797,136 B2 | 9/2004 | Shimamune |
| 6,833,631 B2 | 12/2004 | Van Breems |
| 6,911,126 B1 * | 6/2005 | Slavchev | 204/266 |
| 6,930,402 B1 | 8/2005 | Johnson et al. |
| 6,956,300 B2 | 10/2005 | Gizara |
| 7,132,190 B2 | 11/2006 | Blum et al. |
| 7,303,661 B2 | 12/2007 | Katayama et al. |
| 7,323,090 B2 | 1/2008 | Houda et al. |
| 7,420,287 B2 | 9/2008 | Smushkovich |
| 7,611,618 B2 | 11/2009 | Davidson |
| 7,670,472 B2 | 3/2010 | Faita et al. |
| 7,704,353 B2 | 4/2010 | Stadelmann et al. |
| 7,785,453 B2 | 8/2010 | Dulle et al. |
| 7,834,475 B1 | 11/2010 | Costas |
| 7,872,363 B2 | 1/2011 | Morse |
| 7,892,694 B2 | 2/2011 | Nakano et al. |
| 7,901,549 B2 | 3/2011 | Jupudi et al. |
| 7,906,006 B2 | 3/2011 | Irvine et al. |
| 7,922,879 B2 | 4/2011 | Kodama et al. |
| 7,951,274 B2 | 5/2011 | Yoshida et al. |
| 7,959,773 B2 | 6/2011 | Hou et al. |
| 7,964,068 B2 | 6/2011 | Kitaori et al. |
| 8,066,784 B2 | 11/2011 | Padberg et al. |
| 8,075,749 B2 | 12/2011 | McAlister |
| 8,075,750 B2 | 12/2011 | McAlister |
| 8,273,495 B2 | 9/2012 | Schick et al. |
| 8,277,620 B2 | 10/2012 | Bourgeois |
| 8,808,512 B2 | 8/2014 | Greenbaum |
| 8,888,968 B2 | 11/2014 | Greenbaum |
| 2002/0037422 A1 | 3/2002 | Takahashi et al. |
| 2002/0145288 A1 | 10/2002 | Van Breems |
| 2002/0157958 A1 | 10/2002 | Kikuchi et al. |
| 2003/0057088 A1 | 3/2003 | Ichikawa et al. |
| 2004/0182695 A1 | 9/2004 | Bulan et al. |
| 2005/0052031 A1 | 3/2005 | Atiya |
| 2005/0072688 A1 * | 4/2005 | Meltser | 205/628 |
| 2005/0121917 A1 | 6/2005 | Kikuchi |
| 2007/0228736 A1 | 10/2007 | Smushkovich |
| 2007/0228739 A1 | 10/2007 | Kraczek |
| 2008/0067078 A1 | 3/2008 | Kitaori et al. |
| 2008/0231055 A1 | 9/2008 | Nadel |
| 2008/0257751 A1 | 10/2008 | Smola et al. |
| 2009/0000956 A1 * | 1/2009 | Weidner et al. | 205/637 |
| 2009/0026089 A1 | 1/2009 | Kothe et al. |
| 2009/0058091 A1 | 3/2009 | Douglas |
| 2009/0127130 A1 | 5/2009 | Highgate et al. |
| 2009/0315330 A1 | 12/2009 | Dederick |
| 2010/0012503 A1 | 1/2010 | Hinatsu et al. |
| 2010/0032221 A1 | 2/2010 | Storey |
| 2010/0089766 A1 | 4/2010 | Menear |
| 2010/0164229 A1 | 7/2010 | Lawson |
| 2010/0236939 A1 | 9/2010 | Menear |
| 2010/0244450 A1 | 9/2010 | Tabe |
| 2010/0276933 A1 | 11/2010 | Costas |
| 2010/0280347 A1 | 11/2010 | Shah et al. |
| 2011/0155583 A1 | 6/2011 | Li |
| 2011/0243294 A1 | 10/2011 | Jetter |
| 2012/0119503 A1 | 5/2012 | Van Breems |
| 2012/0149789 A1 | 6/2012 | Greenbaum |
| 2012/0193242 A1 | 8/2012 | Marchal |
| 2012/0241315 A1 * | 9/2012 | Yoshinaga et al. | 204/262 |
| 2013/0068629 A1 | 3/2013 | Bulaclac, Jr. |
| 2015/0026968 A1 | 1/2015 | Greenbaum |

FOREIGN PATENT DOCUMENTS

| | | | | |
|---|---|---|---|---|
| DE | WO 2014040746 A1 * | 3/2014 | | C25B 9/08 |
| EP | 1464728 A1 | 10/2004 | | |
| JP | 2009-131736 A1 | 6/2009 | | |

OTHER PUBLICATIONS

Glowacki, B. et al. 1998. Grain Boundaries and Electronic Materials. Materials World, vol. 6, No. 11, pp. 683-686, Nov. 1998. (Downloaded from http://www.azom.com/article.aspx?ArticleID=628).

Hering, C. 2008. Practical Directions for Winding Magnets for Dynamos. BiblioBazaar, reprinted 2008, 76 pages.

Kruger, J. 2001. Electrochemistry of Corrosion. In Electrochemistry Encyclopedia (Case Western Reserve University, Cleveland, Ohio), 12 pages, Apr. 2001 (Downloaded from http://electrochem.cwru.edu/encycl/art-c02-corrosion.htm).

Mattox, D.M. 2010. The Handbook of Physical Vapor Deposition Processing, Second Edition, May 19, 2010.

NREL/DOE Hydrogen and Fuel Cell Manufacturing R&D Workshop report. 2011. National Renewable Energy Laboratory (NREL) / Department of Energy Office of Energy Efficiency & Renewable Energy, Department of Energy, Aug. 11-12, 2011 (downloaded Apr. 22, 2013 from http://www1.eere.energy.gov/hydrogenandfuelcells/pdfs/mfg2011_wkshp_report.pdf).

Pratt, H. 2012. The NSTA Reader's Guide to a Framework for K-12 Science Education: Practices, Crosscutting Concepts, and Core Ideas. NSTA Press, Arlington, VA, 2012, 36 pages.

Querfurth, W. 1954. Coil Winding: A Description of Coil Winding Procedures, Winding Machines and Associated Equipment. G.

(56) References Cited

OTHER PUBLICATIONS

Stevens Mfg. Co. Pub. 1954, 128 pages. (Uploaded to patent file in 3 files: Querfurth 1, 2, and 3.).
Stansbury, E.E. et al. 2000. Fundamentals of Electrochemical Corrosion. ASM International, Materials Park, Ohio. 14 pages.
US Department of Energy. 2012. Joint Fuel Cells Technologies and Advanced Manufacturing Office Webinar, Fuel Cell Technologies Office and Advanced Manufacturing Office, Webinar dated Nov. 20, 2012.
ISA/European Patent Office. 2014. International Search Report and Written Opinion of the International Searching Authority, dated Feb. 20, 2014, for PCT Application PCT/US2013/068136, filed Nov. 1, 2013, entitled "Hydrolyzer Apparatus and Method for Making It."
U.S. Patent and Trademark Office, 2014. Non-final Office Action, dated Nov. 8, 2013, for U.S. Appl. No. 13/747,238, filed Jan. 23, 2013, entitled "Electrolyzer Apparatus and Method of Making It."
U.S. Patent and Trademark Office, 2014. Final Office Action, dated Mar. 21, 2014, for U.S. Appl. No. 13/747,238, filed Jan. 23, 2013, entitled "Electrolyzer Apparatus and Method of Making It."
U.S. Patent and Trademark Office, 2014. Notice of Allowance, dated Jun. 16, 2014, for U.S. Appl. No. 13/747,238, filed Jan. 23, 2013, entitled "Electrolyzer Apparatus and Method of Making It."
U.S. Patent and Trademark Office, Preinterview first office action, dated Jun. 4, 2014, for U.S. Appl. No. 14/178,878, filed Feb. 12, 2014, entitled "Electrolyzer Apparatus and Method of Making It."
U.S. Patent and Trademark Office, 2014. First action interview—office action, dated Jul. 17, 2014, for U.S. Appl. No. 14/178,878, filed Feb. 12, 2014, entitled "Electrolyzer Apparatus and Method of Making It."
U.S. Patent and Trademark Office, 2014. Notice of Allowance, dated Sep. 24, 2014, for U.S. Appl. No. 14/178,878, filed Feb. 12, 2014, entitled "Electrolyzer Apparatus and Method of Making It."
U.S. Patent and Trademark Office, Art Unit 1754. 2015. First Action interview—office action, dated Jan. 2, 2015, for U.S. Appl. No. 14/514,152, filed Oct. 14, 2014, entitled "Electrolyzer Apparatus and Method of Making It."
U.S. Patent and Trademark Office, 2015. Notice of Allowance, dated Feb. 20, 2015, for U.S. Appl. No. 14/514,152, filed Oct. 14, 2014, entitled "Electrolyzer Apparatus and Method of Making It."
GTA, Inc. (Applicant); Greenbaum, Elias Stanley (Inventor). 2015. Response, dated Sep. 30, 2015, which includes on p. 2 a summary of an examiner interview, held Sep. 16, 2015, in which the two Canadian patents cited herein were first uncovered; arguments over the Canadian patents are asserted on pp. 14-17.
Canadian Intellectual Property Office. 2015. Office Action dated Oct. 15, 2015 for Canadian Application 2,893,861, corresponding to parent of instant CIP application, entitled "Electrolyzer Apparatus and Method of Making It," based on PCT/US2013/068136.
Korean Intellectual Property Office. 2015. Office Action dated Oct. 20, 2015 for Korean Application 10-2015-7018307, corresponding to parent of instant CIP application, entitled "Electrolyzer Apparatus and Method of Making It," based on PCT/US2013/068136.

\* cited by examiner

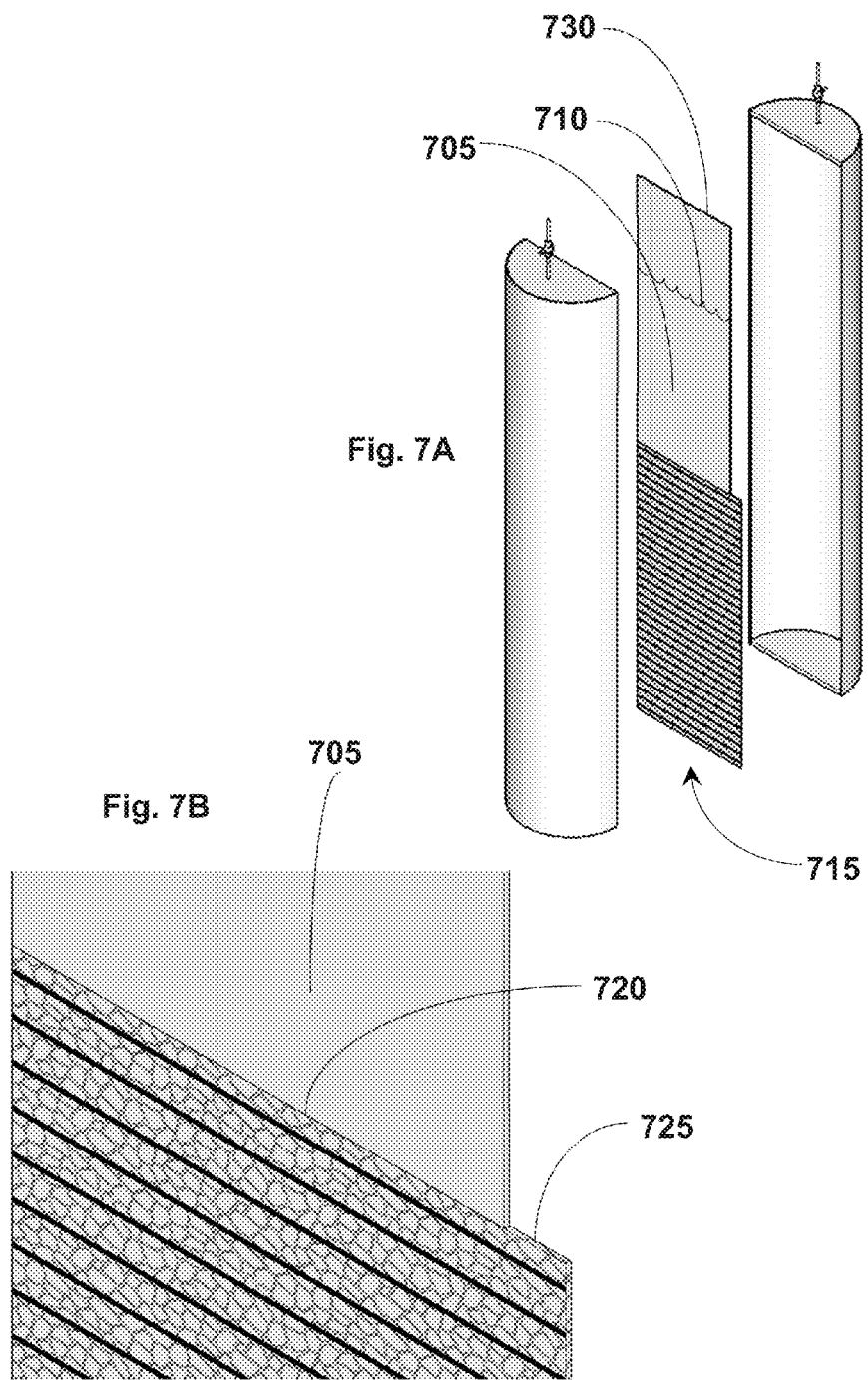

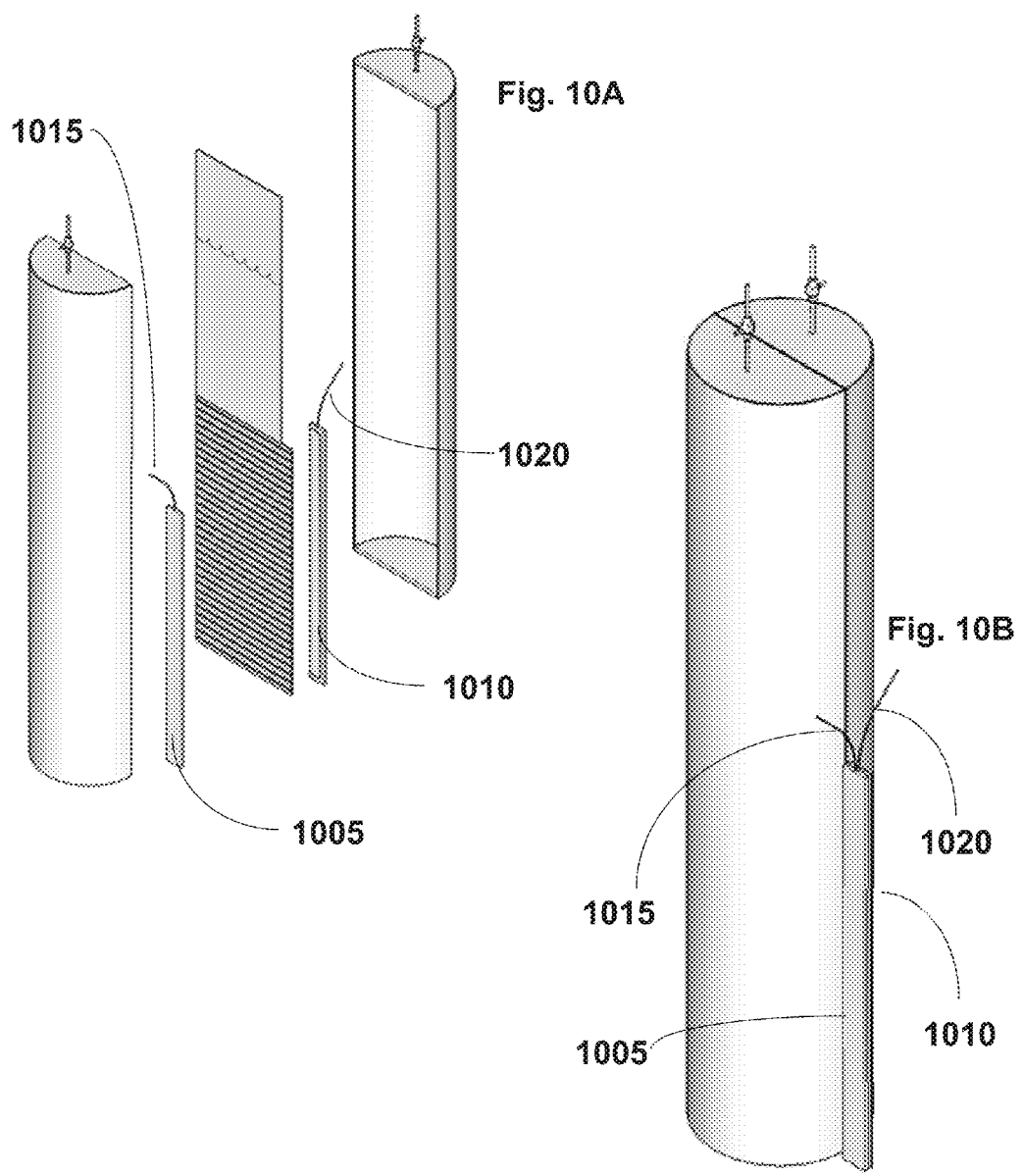

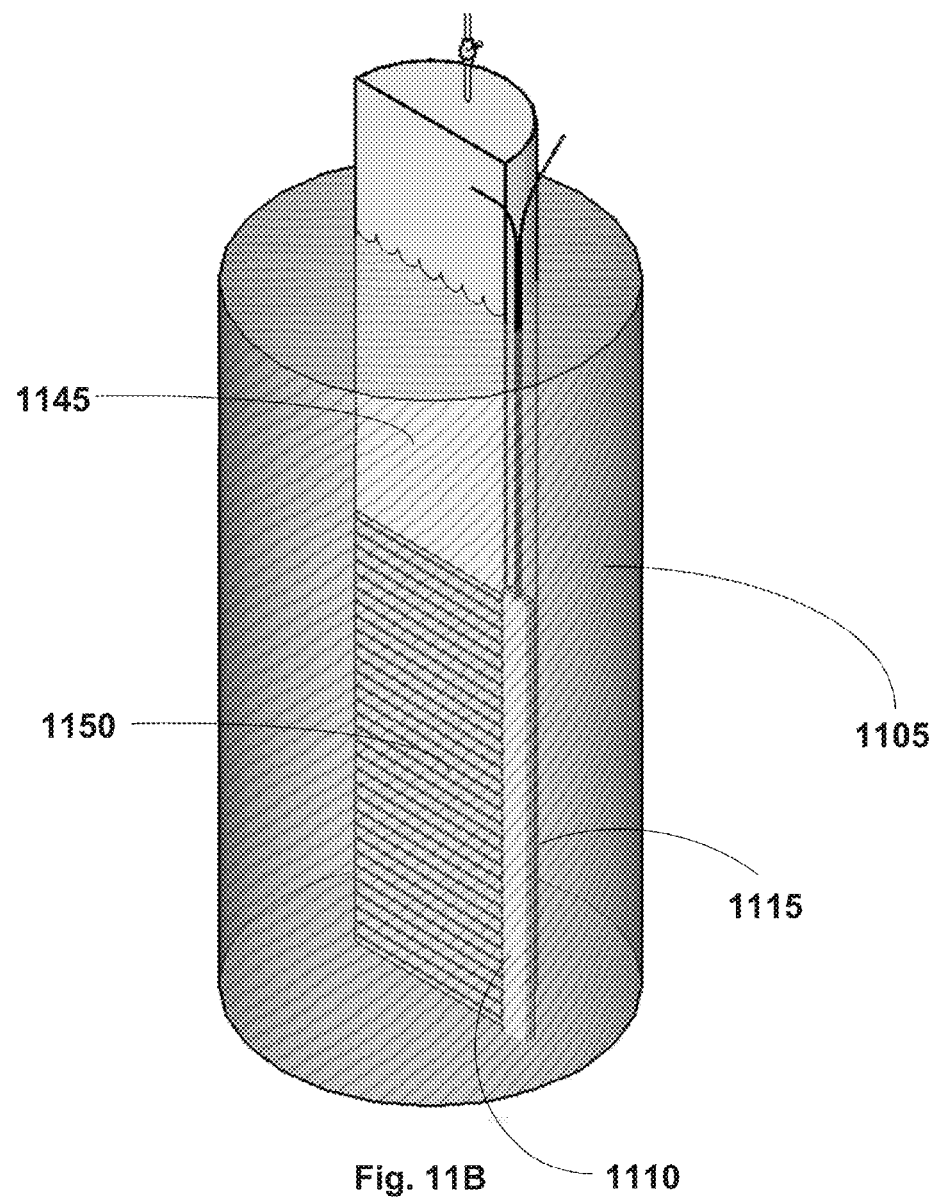

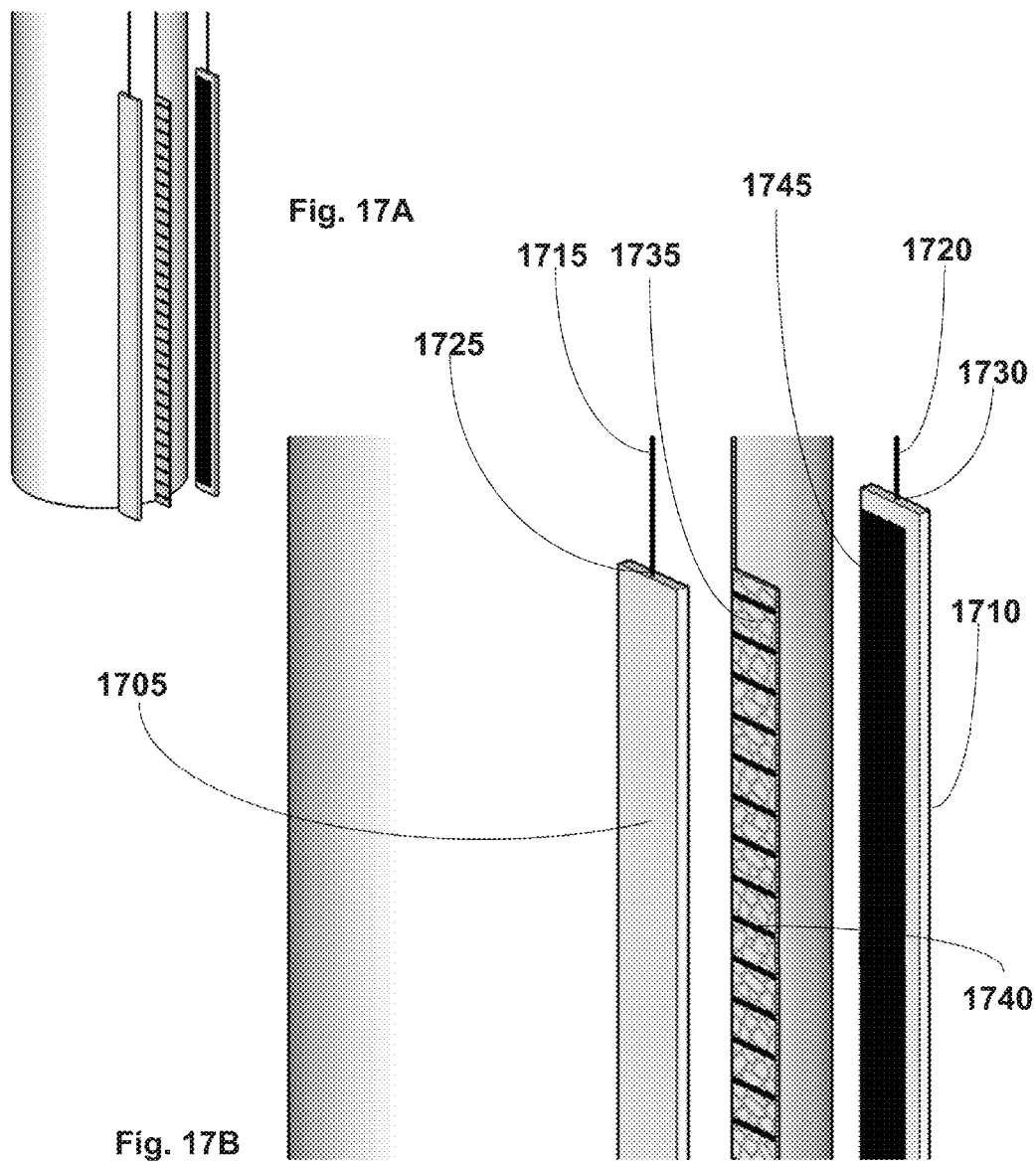

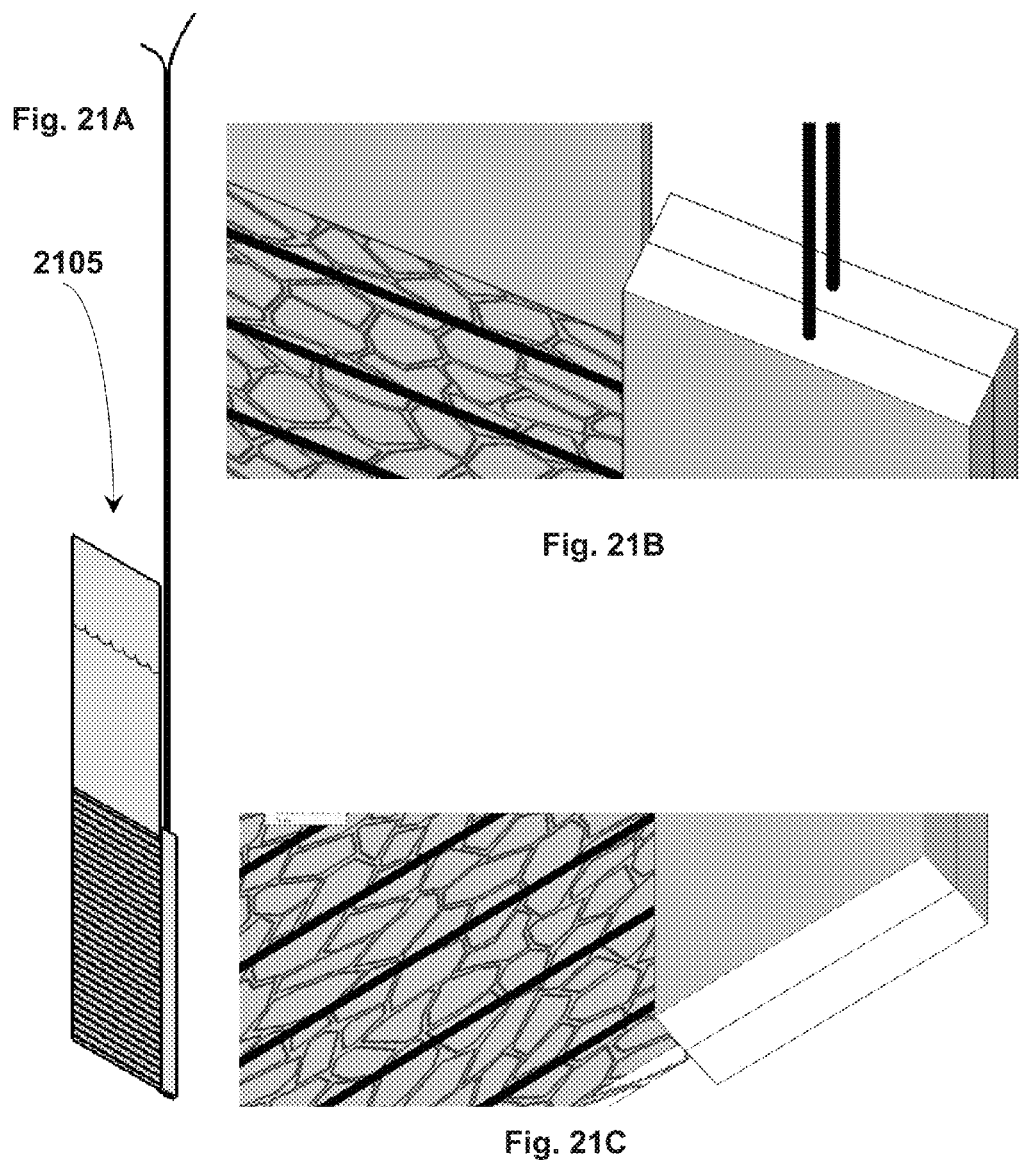

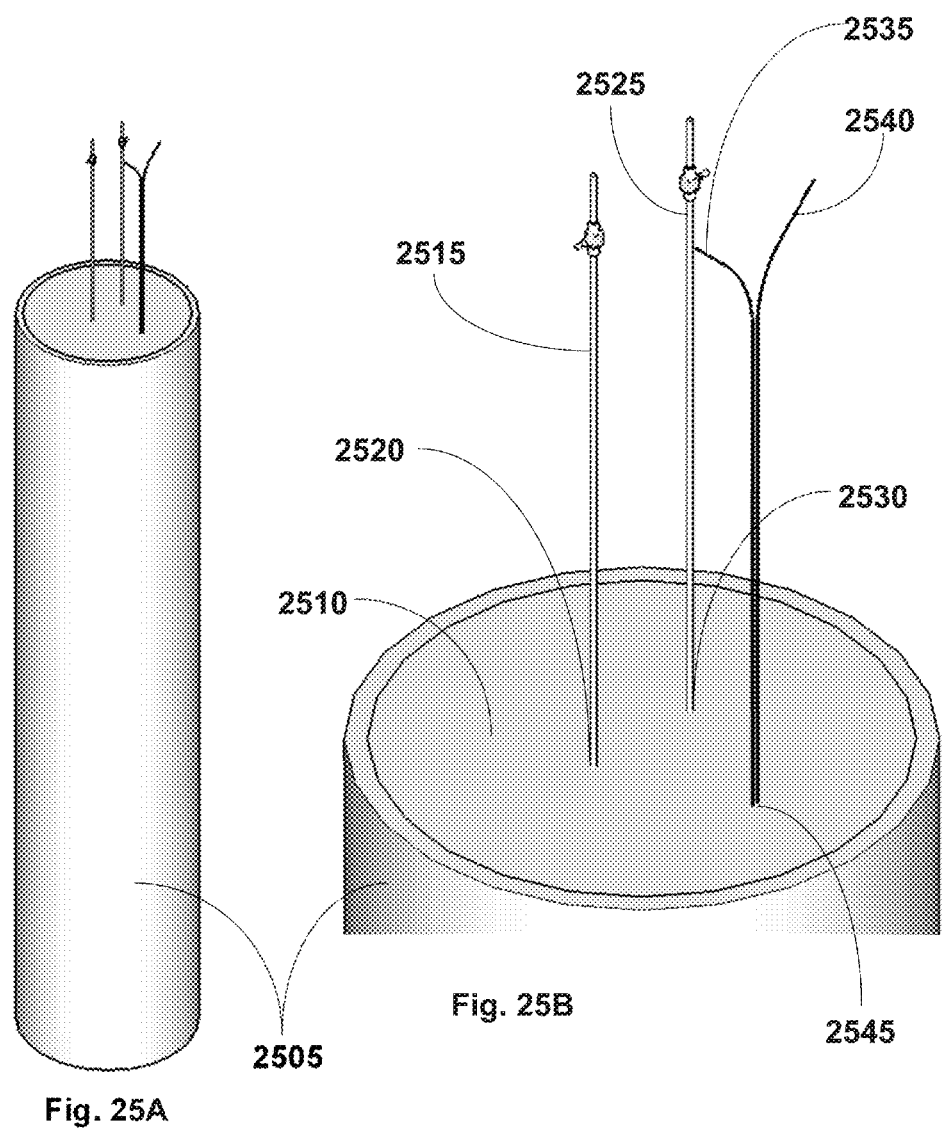

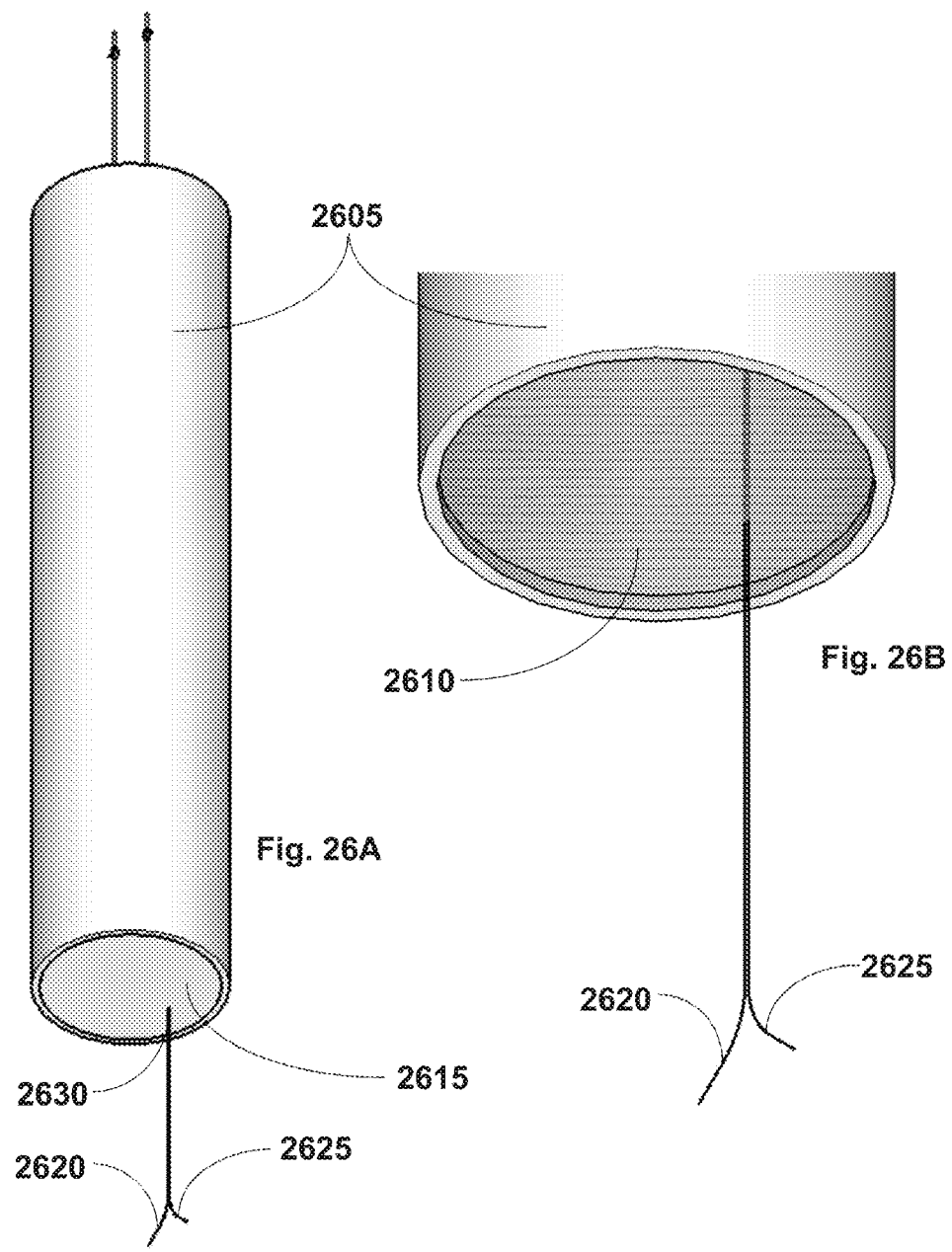

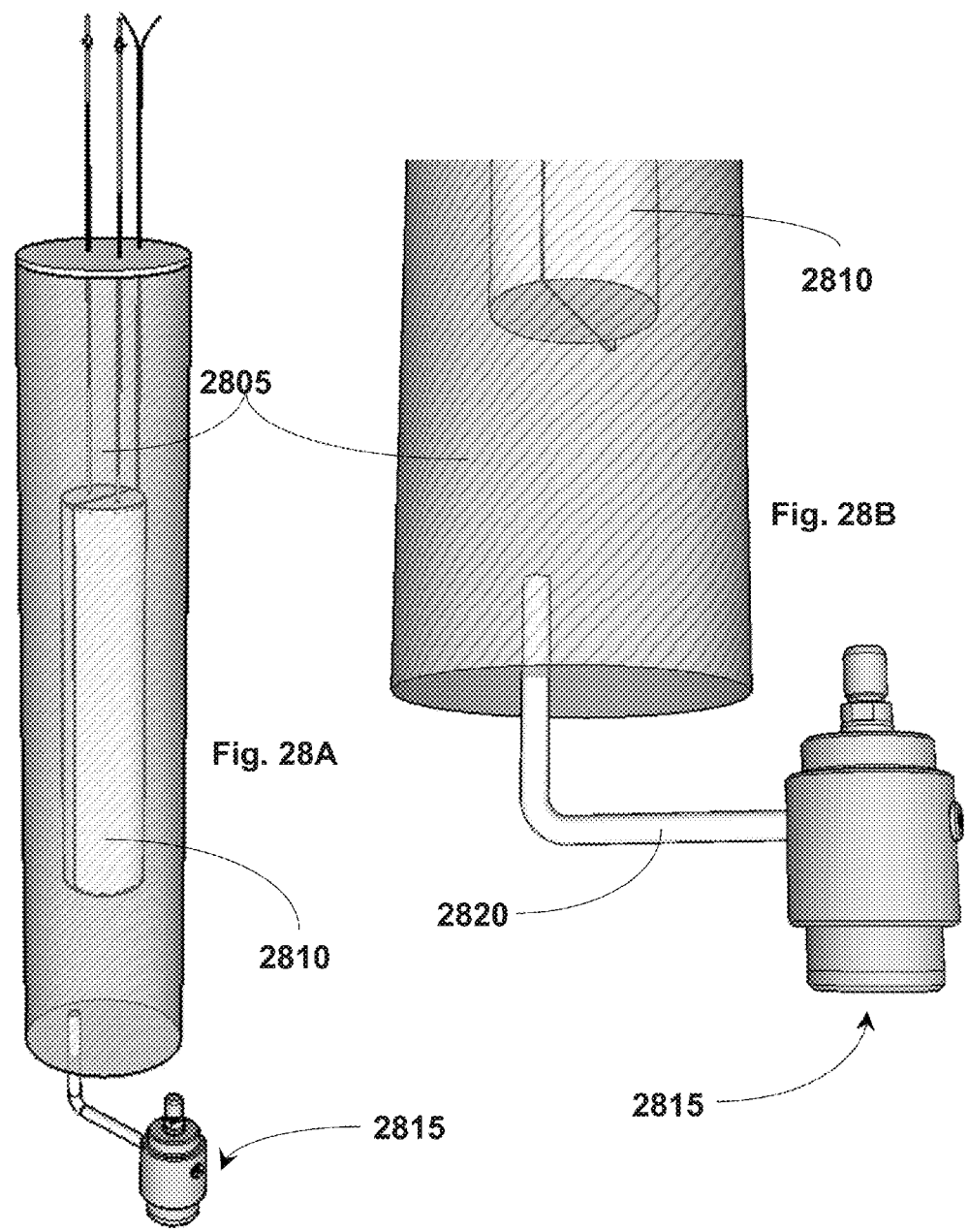

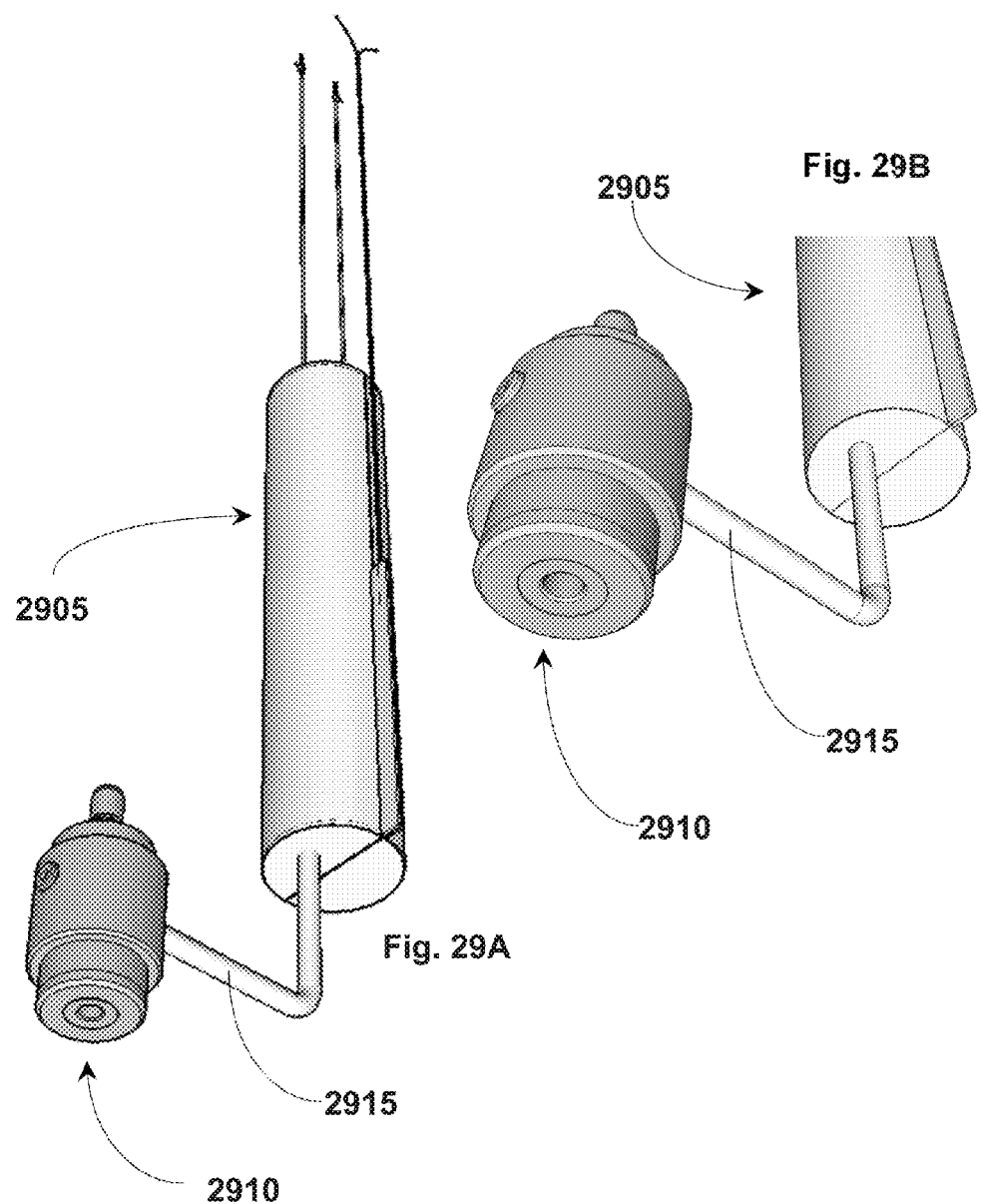

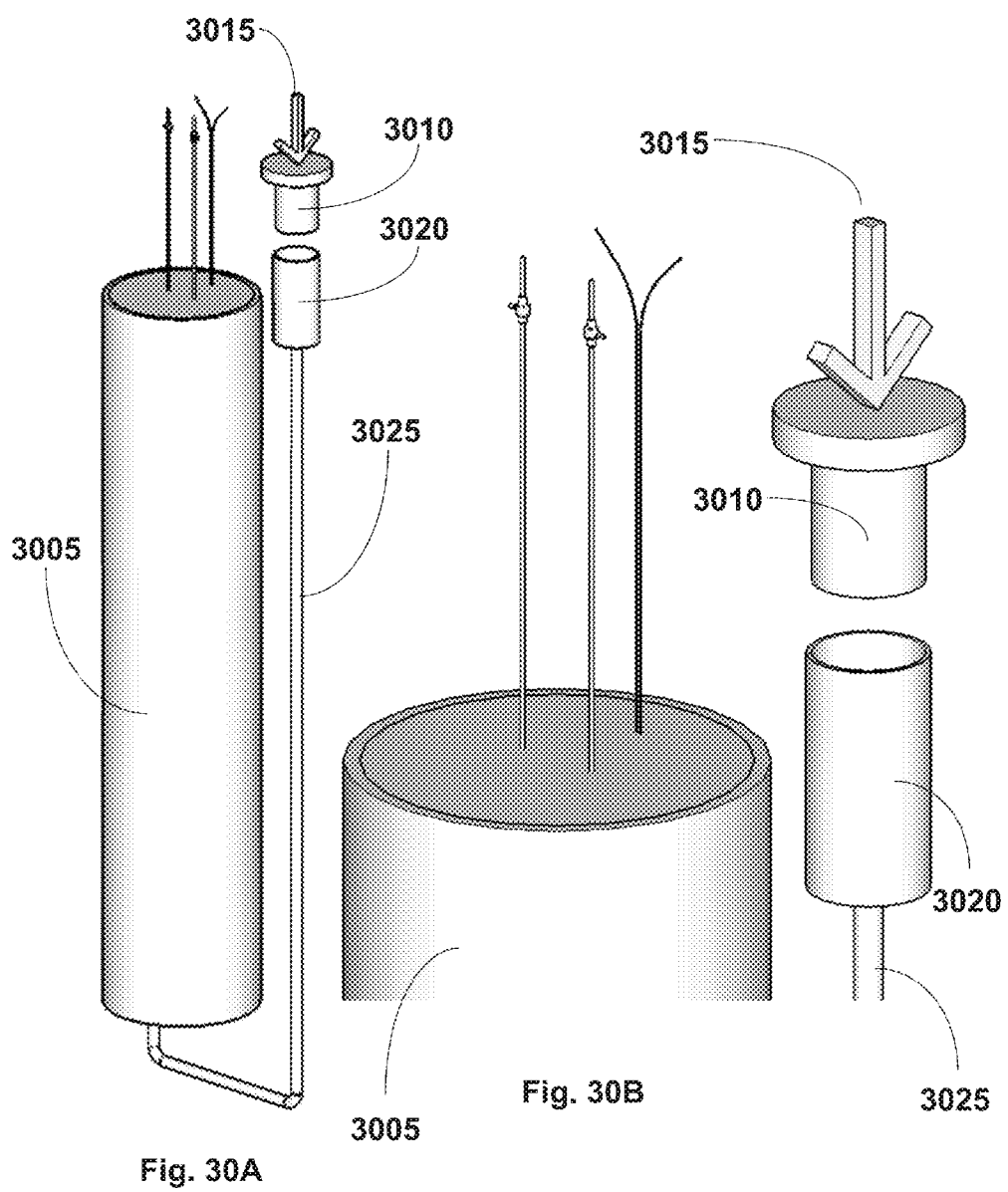

ELECTROLYZER

CROSS-REFERENCE TO RELATED APPLICATIONS

This application is a continuation-in-part of U.S. patent application Ser. No. 14/514,152, entitled "Electrolyzer Apparatus and Method of Making It," filed, Oct. 14, 2014, which is a continuation of U.S. patent application Ser. No. 14/178,878, entitled "Electrolyzer Apparatus and Method of Making It," filed, Feb. 12, 2014, now U.S. Pat. No. 8,888,968, which is a divisional of U.S. patent application Ser. No. 13/747,238, entitled "Electrolyzer Apparatus and Method of Making It," filed, Jan. 22, 2013, now U.S. Pat. No. 8,808,512. The content of all of these patents and patent applications are incorporated herein by reference in their entirety.

BACKGROUND

1. Field

This disclosure relates to electrolysis and more particularly electrolyzer apparatuses for the electrolytic splitting of water into hydrogen and oxygen gases.

2. Description of Related Art

Hydrogen gas is a commodity chemical that is used in numerous manufacturing processes, such as petroleum refining, fertilizer production, glass manufacturing and many others. Hydrogen gas can also be used for storing intermittent renewable energy, such as wind electrical energy and solar electrical energy. Electrolytic hydrogen and oxygen can be produced using nuclear-energy generated electricity and transported in pipe lines to distances remote from the nuclear reactor.

One commercial process for hydrogen production is steam reforming from hydrocarbons. However, steam reforming may utilize non-renewable sources of energy. Carbon monoxide and carbon dioxide may be by-products of fossil fuel-based methods for hydrogen production. There is considerable interest in finding non-polluting methods for large scale production of hydrogen, such as the electrolysis of water.

Electrolysis of water is a route to the production of hydrogen gas. Moreover, gaseous oxygen may be produced as a byproduct which may be a useful and valuable industrial and medical product. Electricity that is generated by renewable energy sources, such as wind, hydroelectric, solar and nuclear energy, can be used for electrolytic production of hydrogen and oxygen without the carbon dioxide and carbon monoxide that accompanies hydrogen production from fossil fuels. References directed to electrolysis and hydrogen and oxygen production in hydraulic, hydrokinetic and submerged water environments include, for example: published U.S. patent application numbers 20130068629, 20120119503, 20100276933, 20100244450, 20100236939, 20100164229, 20100089766, 20090315330, 20090058091, 20080231055, 20070228736, 20070228739, 20050121917, 20050052031, 20020145288; and U.S. Pat. Nos. 7,872,363, 7,834,475, 7,420,287, 6,956,300, 6,930,402, 6,833,631, 6,759,757, 6,326,703, 4,490,232, 4,443,708, 4,437,963, 4,357,543, 4,178,517.

SUMMARY

An electrolysis apparatus may split water into hydrogen and oxygen gases. The apparatus may include a first hemi-enclosure having a facing edge; a second hemi-enclosure having a facing edge that is separable from and not integral with the first hemi-enclosure; a diaphragm that passes ions and impedes the passage of gas comprising a first side and a second opposing side, the diaphragm positioned between the facing edges of the first hemi-enclosure and the second hemi-enclosure, whereby the first hemi-enclosure and one side of the diaphragm form a first compartment and the second hemi-enclosure and the other side of the diaphragm form a second compartment; one or more electrodes in the first compartment that each pass through a first interface between the first side of the diaphragm and the facing edge of the first hemi-enclosure and that each span a width of the first interface; one or more electrodes in the second compartment that each pass through a second interface between the second side of the diaphragm and the facing edge of the second hemi-enclosure and that each span a width of the second interface; a first pipe that allows gas within the first compartment to escape; a second pipe that allows gas within the second compartment to escape; a fastener that fastens the first hemi-enclosure, the diaphragm, the one or more electrodes, and the second hemi-enclosure together; and electrical contacts that receive energy from an external source and deliver it to the electrodes.

The electrodes may be wire electrodes.

The electrolysis apparatus may include a headspace barrier that abuts an edge of the diaphragm and is impermeable to ions, gases and water.

The electrodes may extend beyond the apparatus.

The diaphragm may have as a perimeter edge and at least a portion of this perimeter edge may be fastened to a strip that is impermeable to gas, water and ions.

The electrolysis apparatus may cause pressure of gas in the first compartment and pressure of gas in the second compartment to be substantially equal.

The electrolysis apparatus may include at least one back pressure regulator connected to the first compartment and at least one back pressure regulator connected to the second compartment. Both back pressure regulators may be set to cause the back pressures of gases in the first and the second compartments to be substantially equal.

The electrolysis apparatus may include a first variable orifice valve connected to the first compartment; a second variable orifice valve connected to the second compartment; and a differential pressure gauge that detects a difference between the pressure of gas in the first compartment and the pressure of gas in the second compartment and controls the first and the second variable orifices so as to substantially equalize the pressures of gases in the first and the second compartments.

The electrolysis apparatus may include a back pressure regulator that receives gas pressure data from the first compartment and uses the data to maintain the gas pressure in the second compartment equal to the gas pressure in the first compartment.

The electrolysis apparatus may include at least one location in the apparatus wherein external ions in fluid surrounding the apparatus can pass from the exterior of the apparatus into the first and second compartments. At least one location may be between the first hemi-enclosure and the second hemi-enclosure. The at least one location may be on the diaphragm. A one-way valve may be at the at least one location. 14.

The electrolysis apparatus may include an electrical conductor passing from the outside to the inside of the first fluid-tight compartment in a leak tight manner and in electrical contact with the one or more electrodes in the first compartment; and an electrical conductor passing from the outside to the inside of the second fluid-tight compartment in a leak tight manner and in electrical contact with the one or more electrodes in the second compartment.

The electrolysis apparatus may include a fluid containing vessel that substantially surrounds the fastened together first hemi-enclosure, diaphragm, electrodes, and second hemi-enclosure.

The electrolysis apparatus may include a pressure-transmitting tube passing between the outside and inside of the fluid containing vessel.

The electrodes may extend beyond the fluid containing vessel.

The electrolysis apparatus may include at least one impeller in at least one of the pipes that rotates when gas flows within the at least one of the pipes; and at least one electric generator that converts rotation of the impeller into electrical power.

An apparatus may produce hydrogen and oxygen from water. The apparatus may include an electrolysis apparatus that may include at least one first electrode inside of a first electrode compartment; at least one second electrode inside of a second electrode compartment; and a diaphragm that passes ions and impedes the passage of gas positioned between the at least one first electrode and the at least one second electrode and that forms a common barrier of the first and second electrode compartments. The apparatus may also include a leak tight vessel completely surrounding the electrolysis apparatus that is capable of holding fluid in an interior region that completely surrounds the first electrode compartment and the second electrode compartment in a leak tight manner; one or more fluid communication channels between the interior region of the vessel and the inside of the first electrode compartment; a first electrode compartment gas removal pipe that channels gas formed within the first electrode compartment outside of the vessel; a second electrode compartment gas removal pipe that channels gas formed within the second compartment outside of the vessel; a first electrical conductor that conducts electricity from outside of the vessel to the at least one first electrode; a second electrical conductor that conducts electricity from outside of the vessel to the at least one second electrode; and a fluid-conducting tube that permits fluid outside of the vessel to be transmitted into the interior region of the vessel and, in turn, into the first electrode compartment through the one or more fluid communication channels.

The apparatus may include at least one back pressure regulator that causes the pressures in the first and second compartments to be equal.

These, as well as other objectives, components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIGS. 7A and 7B show a top perspective exploded view of an embodiment of an electrolyzer apparatus and a detailed view of a diaphragm, electrodes and headspace barrier.

FIGS. 10A-10C show top perspective exploded, assembled and detailed views of embodiments of water-tight seals that make leak tight electrical contact with an embodiment of an electrolyzer apparatus.

FIGS. 11A and 11B show views of an embodiment of an electrolyzer apparatus that is surrounded by water.

FIGS. 17A and 17B show exploded views of an embodiment of water-tight electric contact seals for an embodiment of an electrolysis apparatus.

FIGS. 21A-21C show an overall perspective view (FIG. 21A), a detailed top perspective view (FIG. 21B) and a detailed bottom perspective view (FIG. 21C) of an embodiment of water-tight electric contact seals for an embodiment of an electrolysis apparatus.

FIGS. 25A and 25B show top perspective views of an embodiment of an electrolysis apparatus submerged in a water-containing vessel with a top plate attached.

FIGS. 26A-26D show bottom perspective views of an embodiment of electrical contact with the electrodes of an embodiment of an electrolysis apparatus via the bottom plate of a water-containing vessel.

FIGS. 28A and 28B show perspective views of an embodiment of a compressor system transmitting pressure to water in a vessel with the vessel removed.

FIGS. 29A and 29B show perspective views of an embodiment of a compressor system transmitting pressure to water in an embodiment of an electrolysis apparatus.

FIGS. 30A and 30B show perspective views of an embodiment of transmitting pressure to gas in gas removal tubes in an electrolysis apparatus that is surrounded by water in an embodiment of a water-containing vessel using a piston and cylinder system.

DETAILED DESCRIPTION OF ILLUSTRATIVE EMBODIMENTS

Figures 1A, 1B:
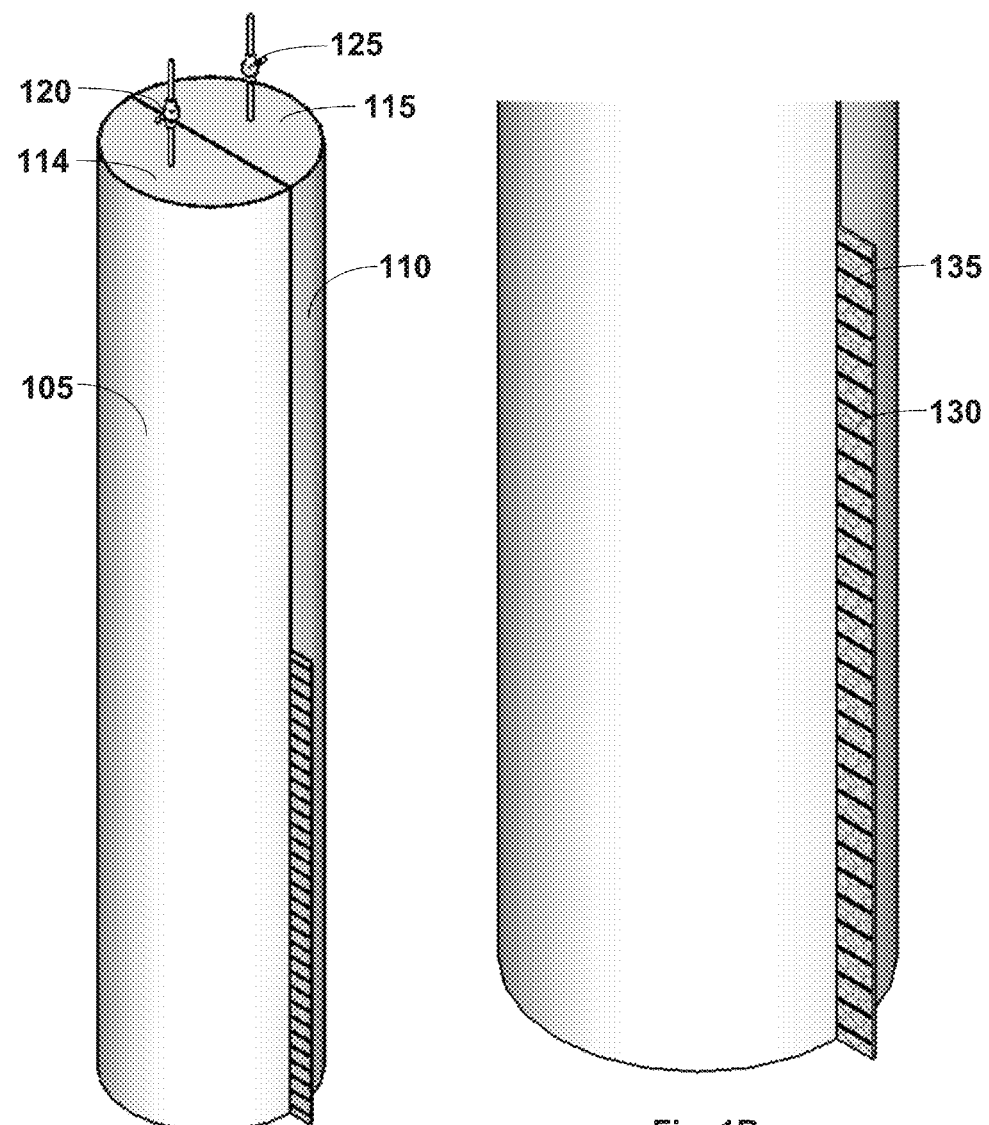
FIGS. 1A-1D show perspective and detailed views of an embodiment of an electrolyzer apparatus comprising remotely controlled pressure regulators.

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described. The disclosed embodiments are not limited by the ordering of acts or procedures. Some acts may occur in different orders and/or simultaneously with other acts or events, such as the acts of rotation and linear movement, for example. Not all illustrated acts or events are required to implement a procedure and/or method described in the disclosure.

As used herein:

"Back pressure regulator" means a normally-closed valve that provides an obstruction to flow but opens when an upstream set pressure is reached. Check valves and relief valves are included in this definition.

"Differential pressure gauge" means a gauge that measures difference in gas pressure.

"One-way valve" means a valve that allows fluid to flow through it in only one direction when the pressure difference across the valve has the appropriate direction and magnitude.

"Pressurize" means to produce a pressure above the ambient pressure of an electrolysis apparatus.

"Variable orifice valve" means a valve that regulates pressure or flow by adjusting the size of its orifice.

One embodiment of an apparatus for the electrolytic splitting of water into hydrogen and oxygen gases may include (i) a first hemi-enclosure having a facing edge; (ii) a second hemi-enclosure having a facing edge that is separable from and not integral with the first hemi-enclosure; (iii) a diaphragm that passes ions and impedes the passage of gas comprising a first side and a second opposing side, the diaphragm positioned between the facing edges of the first hemi-enclosure and the second hemi-enclosure, whereby the first hemi-enclosure and one side of the diaphragm form a first compartment and the second hemi-enclosure and the other side of the diaphragm form a second compartment; (iv) one or more electrodes in the first compartment that each pass through a first interface between the first side of the diaphragm and the facing edge of the first hemi-enclosure and that each span a width of the first interface; (v) one or more electrodes in the second compartment that each pass through a second interface between the second side of the diaphragm and the facing edge of the second hemi-enclosure and that each span a width of the second interface; (vi) a first pipe that allows gas within the first compartment to escape; (vii) a second pipe that allows gas within the second compartment to escape; (viii) a fastener that fastens the first hemi-enclosure, the diaphragm, the one or more electrodes, and the second hemi-enclosure together; and (ix) electrical contacts that receive energy from an external source and deliver it to the electrodes.

In some embodiments the electrodes are wire electrodes. Some embodiments comprise a headspace barrier that abuts an edge of the diaphragm and is impermeable to ions, gases and water and includes a water-fill region. In some embodiments the electrodes extend beyond the apparatus. In some embodiments at least one of the edges of the diaphragm is fastened to a strip that is impermeable to gas, water and ions. Multiple methods may be used to fasten the strip to the diaphragm including: directed energy, heating, welding, soldering, fusing and gluing, as examples.

In some embodiments the pressure of the gas in the first compartment and the pressure of the gas in the second compartment are equal. Equality of pressure in the first and second compartments may be achieved in multiple ways. For example, the compartments may vent to the same ambient pressure such as atmospheric pressure.

The pressures in first and second pressurized compartments may be regulated using equal set pressures for first and second back pressure regulators that regulate the pressures in the first and second compartments respectively. The regulators may be operated manually or remotely. In some embodiments a back pressure regulator may be configured to sense the pressure in a first compartment of an electrolysis apparatus and use it as a reference for setting the pressure to an equal value in a second compartment. In some embodiments the reference pressure may be independent of the electrolysis apparatus.

Equality of pressure in the first and second compartments may also be achieved with a differential pressure gauge that measures the pressure difference between the first and second compartments and communicates the difference to a first adjustable orifice valve for the first compartment and a second adjustable orifice valve for the second compartment, whereby the first and second compartments are set to equal pressures.

In some embodiments the electrolysis apparatus may be surrounded by water and include at least one location wherein external ions in the surrounding water may pass from the exterior of the apparatus into the interior of the apparatus. In some embodiments the at least one location is between a first hemi-enclosure and a second hemi-enclosure. In other embodiments the at least one location is on a perimeter edge of a diaphragm that passes ions and impedes the passage of gas. In other embodiments the at least one location includes a one-way valve. In some embodiments the water partially surrounds the electrolysis apparatus. In other embodiments the water fully surrounds the apparatus.

In some embodiments electrical contacts that receive electricity that power the electrolysis apparatus may be sealed in fluid-tight compartments. In some embodiments sealing may be achieved by fastening cover plates over the contacts to shield them from water. In some embodiments the sealing may include gaskets, rubber liners, greases, aquarium cements, screws, bolts and nuts. In other embodiments, the water-tight sealing may include directed energy, welding, heating, leak-tight paints, coatings and films or polymers.

In some embodiments the interior of the electrolysis apparatus is pressurized. Pressurizing the apparatus may be achieved in multiple ways. In one embodiment pressurizing is achieved by the difference in height between an external water level and a water level in the apparatus. In other embodiments the apparatus may be pressurized electrically wherein electrolysis is performed in a sealed apparatus and a voltage is applied to the electrodes to electrolyze water to hydrogen and oxygen whereby the electrolytically produced gases are pressurized.

Some embodiments comprise a vessel that contains water in which the electrolysis apparatus is partially or fully submerged. In some embodiments the water-containing vessel is pressurized. In some embodiments the water in the water containing vessel is pressurized using a compressor system. In other embodiments the pressurization system comprises a piston and cylinder system. In some embodiments the gases in the electrolysis apparatus are pressurized by the surrounding water in the vessel.

In some embodiments the electrodes extend beyond the electrolysis apparatus and the water containing vessel. The electrodes may pierce the water containing vessel in a leak tight manner whereby access to the electrodes is external to the water in the vessel in a dry environment. In some embodiments the electrodes extend beyond the electrolysis apparatus and penetrate into the wall of the water-containing vessel, but not beyond the wall. The electrical leads that make contact with the electrodes are embedded in the wall of the water containing vessel. In some embodiments the electric leads are comprised of superconducting material.

In some embodiments the electrolysis apparatus further comprises at least one impeller and at least one electric generator in at least one gas removal pipe for conversion of gas flow power into electrical power.

An apparatus for the production of hydrogen and oxygen from water is disclosed, the apparatus comprising: (i) at least one cathode electrode in a cathode compartment; (ii) at least one anode electrode in an anode compartment; (iii) at least one location that is permeable to fluid; (iv) a leak tight vessel surrounding the electrolysis apparatus and capable of holding fluid in a leak tight manner; (v) a first cathode compartment gas removal pipe that penetrates into the cathode compartment and emerges from the vessel; (vi) a second anode compartment gas removal pipe that penetrates into the anode compartment and emerges from the vessel; (vii) electrical wires that penetrate the vessel and contact the at least one cathode electrode; (viii) electrical wires that penetrate the vessel and contact the at least one anode electrode; and (ix) a pressure-transmitting tube passing between the outside and inside of the vessel.

A first method for using an electrolysis apparatus for the electrolysis of water into hydrogen and oxygen gases is disclosed, the first method comprising steps in the following order: (i) placing one or more electrodes on a first side of a substantially planar diaphragm that passes ions and impedes the passage of gas; (ii) placing one or more electrodes on a second opposing side of the diaphragm whereby a diaphragm electrode array is formed; (iii) placing the diaphragm electrode array between facing edges of a first hemi-enclosure and a second hemi-enclosure wherein a first compartment and a second compartment are formed and wherein segments of the electrodes that are external to the compartments are equal to or greater than the width of the edges; (iv) fastening the diaphragm electrode array, the first hemi-enclosure and the second hemi-enclosure; (v) connecting a first pipe configured to remove gas from the first compartment; (vi) connecting a second pipe configured to remove gas from the second compartment whereby an electrolysis apparatus is formed; (vii) adding water to the electrolysis apparatus; (viii) applying electric power to the one or more electrodes in the first compartment and to the one or more electrodes in the second compartment whereby water is electrolyzed into hydrogen and oxygen gases. In some embodiments of the first method the gas pipe connecting steps precede the fastening step.

In some embodiments of the first method the placings steps are performed with wire electrodes. Some embodiments of the first method include attaching a headspace barrier to the diaphragm before or immediately after the one or more electrode placings steps. Some embodiments of the first method include fastening a strip to the diaphragm that is impermeable to gas, water and ions prior to the first and second one or more electrode placings steps. Some embodiments of the first method include connecting at least one back pressure regulator to the first compartment and connecting at least one back pressure regulator to the second compartment of the electrolysis apparatus wherein the set pressures of the regulators are equal, whereby the pressures of the first and second compartments are equal. Some embodiments of the first method include connecting a differential pressure gauge and variable orifice valves to the first gas removal pipe and the second gas removal pipe of the apparatus that cause the pressures in the first and second compartments to be equal. Some embodiments of the first method include connecting a back pressure regulator to the second compartment of the apparatus, receiving pressure data from the first compartment of the apparatus and using the received data from the first compartment for adjusting the pressure of the second compartment whereby the pressure in the first compartment and the pressure in the second compartment are equal.

Some embodiments of the first method include adding aqueous ions to the first and second compartments through at least one location on the apparatus that is permeable to aqueous ions. In some embodiments the adding step is performed between the first hemi-enclosure and the second hemi-enclosure. In some embodiments the adding step is performed on the diaphragm. In some embodiment of the first method the adding step is performed using a one-way valve. In some embodiments, the applying electric power step includes the step of sealing the electric contacts in leak tight electric contact seals.

Some embodiments of the first method include surrounding the electrolysis apparatus with water. Some embodiments of the first method include submerging the electrolysis apparatus in water. Some embodiments of the first method include submerging the electrolysis apparatus in water that is contained in a water containing vessel. Some embodiments of the first method include penetrating the water containing vessel with a pressure-transmitting tube whereby pressure is transmitted to the water in the water containing vessel and to the interior of the electrolysis apparatus. Some embodiments of the first method include extending the electrode contacts beyond the water containing vessel. Some embodiments of the first method include inserting at least one impeller and at least one electric generator into at least one of the gas removal pipes whereby gas flow power is converted into electric power.

A second method for using an electrolysis apparatus for the electrolysis of water into hydrogen and oxygen gases is disclosed, the second method comprising steps in the following order: (i) placing an electrolysis apparatus into water that is contained in a water containing vessel, the electrolysis apparatus comprising at least one cathode electrode in a cathode compartment, at least one anode electrode in an anode compartment, at least one location that is permeable to water, a first gas removal pipe connected to the cathode compartment that penetrates and emerges from the vessel, a second gas removal pipe connected to the anode compartment that penetrates and emerges from the vessel; (iii) attaching a pressure-transmitting tube that penetrates the water containing vessel, whereby pressure is transmitted to the water in the water containing vessel and to the interior of the electrolysis apparatus via the at least one permeable location; (iii) applying electric power to the at least one cathode electrode in the cathode compartment and to the at least one anode electrode in the anode compartment whereby an electrolysis apparatus is used for the electrolysis of water to hydrogen and oxygen gases. All penetrations are leak tight.

Some embodiments of the second method include connecting at least one back pressure regulator to the cathode compartment and connecting at least one back pressure regulator to the anode compartment. Some embodiments of the second method include connecting a differential pressure gauge and variable orifice valves to the first gas removal pipe and the second gas removal pipe. Some embodiments of the second method include connecting a back pressure regulator to the second compartment, receiving pressure data from the first compartment and using the received data from the first compartment for adjusting the pressure of the second compartment whereby the pressure in the first compartment and the pressure in the second compartment are equal. Some embodiments of the second method include inserting at least one impeller into at least one gas removal pipe and at least one electric generator whereby gas flow power is converted into electric power.

Figure 1C:
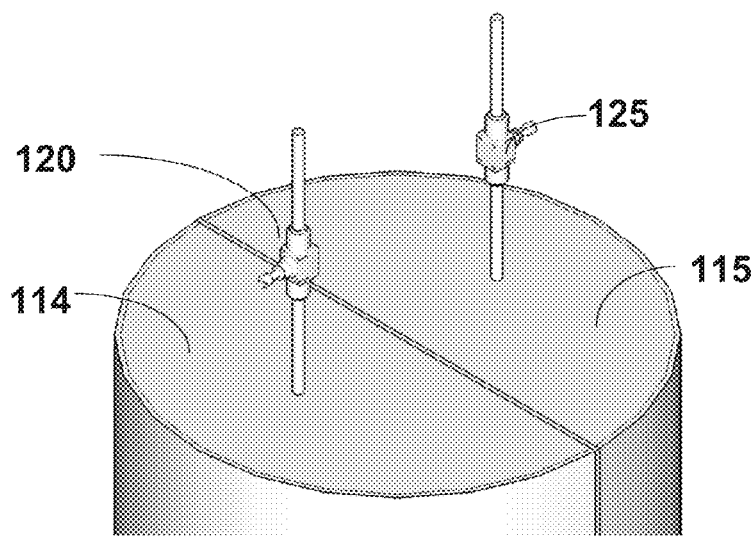
Figure 1D:
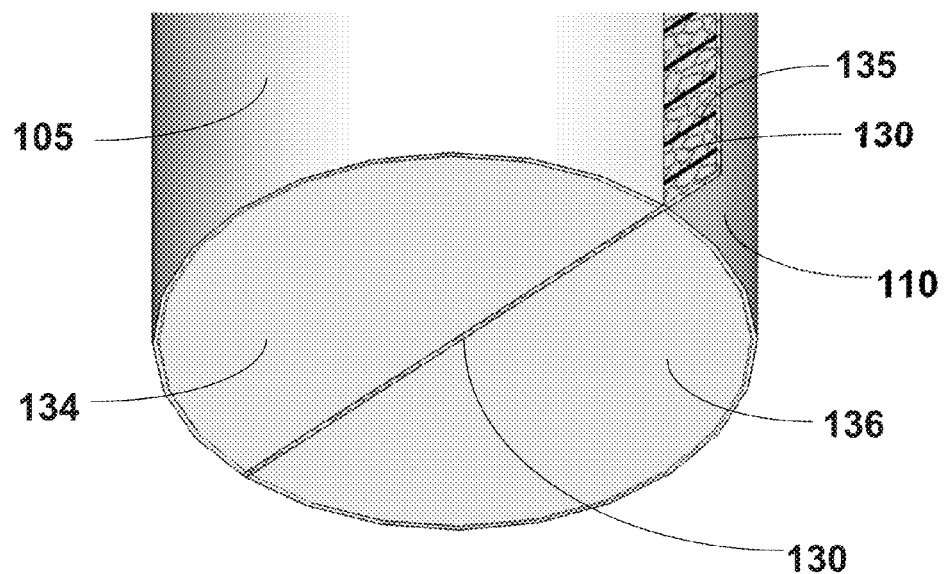

FIG. 1A shows a top perspective view of an embodiment of an electrolyzer apparatus comprising first hemi-enclosure 105, second hemi-enclosure 110, first top plate 114, second top plate 115, first remotely controlled pressure regulator 120 and second remotely controlled pressure regulator 125. FIG. 1B shows a detailed perspective view of an embodiment of the electric contact region of a diaphragm electrode array that is external to the electrolysis apparatus housing comprising diaphragm 130 and one or more electrodes 135. FIG. 1C is a detailed top perspective view of the electrolysis apparatus showing first top plate 114, second top plate 115, first remotely controlled pressure regulator 120 and second remotely controlled pressure regulator 125. FIG. 1D is a detailed bottom perspective view of the electrolysis apparatus showing first hemi-enclosure 105, second hemi-enclosure 110, diaphragm 130, one or more electrodes 135, first bottom plate 134 and second bottom plate 136.

Figure 2A:
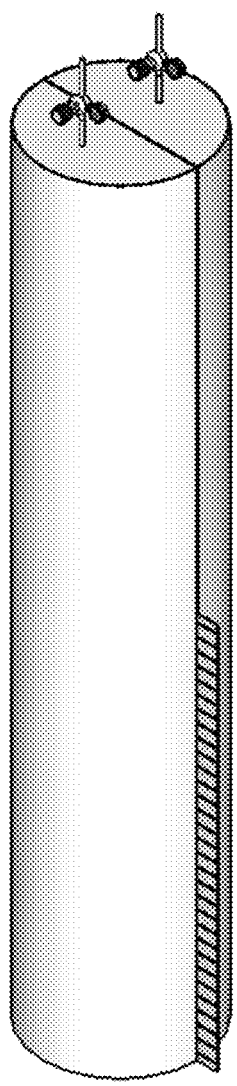
FIGS. 2A and 2B show perspective (FIG. 2A) and detailed (FIG. 2B) views of an embodiment of an electrolyzer apparatus comprising manually controlled pressure regulators.
Figure 2B:
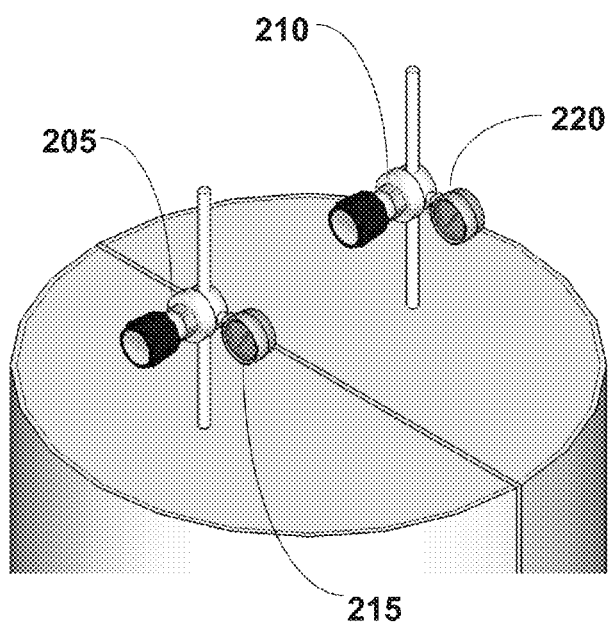

FIG. 2A shows a top perspective view of an embodiment of an electrolyzer apparatus comprising manually operated back pressure regulators. FIG. 2B is a detailed top perspective view of an embodiment of the apparatus showing first manual back pressure regulator 205, second manual back pressure regulator 210, first gauge 215 and second gauge 220.

Figure 3A:
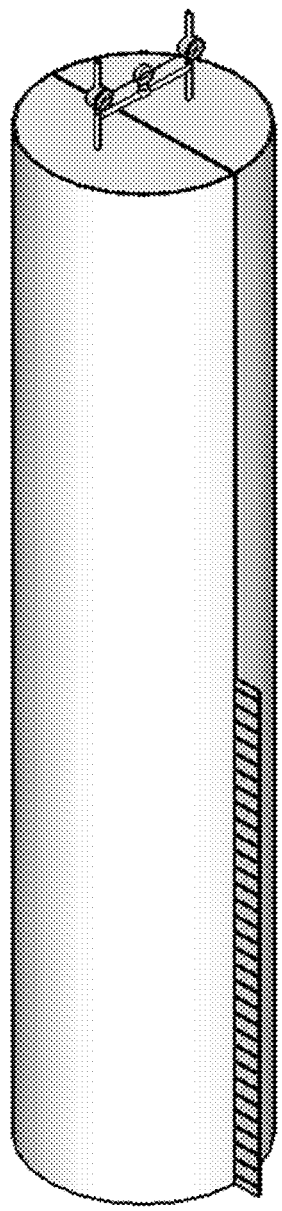
FIGS. 3A and 3B show top perspective views of an embodiment of an electrolyzer apparatus comprising a differential pressure gauge and variable orifice valves.
Figure 3B:
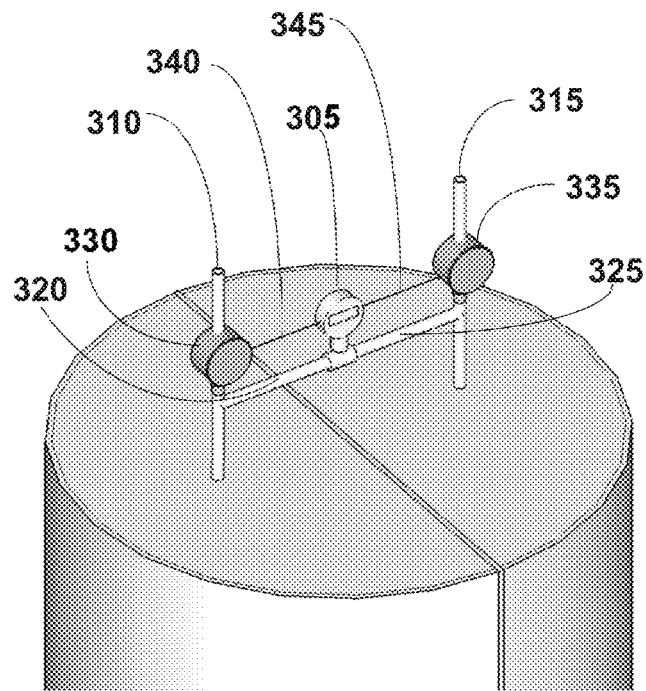

FIG. 3A shows a top perspective view of an embodiment of an electrolyzer apparatus comprising a differential pressure gauge and variable orifice valves. FIG. 3B is a detailed top perspective view of the apparatus showing differential pressure gauge 305, first gas removal pipe 310 that communicates with a first compartment in the apparatus via a first variable orifice valve 330, second gas removal pipe 315 that communicates with a second compartment in the apparatus via a second variable orifice valve 335, first communication pathway 320 between the differential pressure gauge 305 and the first compartment, second communication pathway 325 between the differential pressure gauge 305 and the second compartment, first communication pathway 340 between the differential pressure gauge 305 and the first variable orifice valve 330 and second communication pathway 345 between the differential pressure gauge 305 and the second variable orifice valve 335. Pressure information received by differential pressure gauge 305 from the first and second compartments via communication pathways 320 and 325 are communicated to first and second variable orifice valves 330 and 335 via communication pathways 340 and 345 wherein the openings of the valve orifices operate to substantially zero the output of the differential pressure gauge 305, whereby the pressures of the first and second compartments are substantially equal. The communication pathways may be wired pathways or wireless pathways.

Figures 4A, 4B:
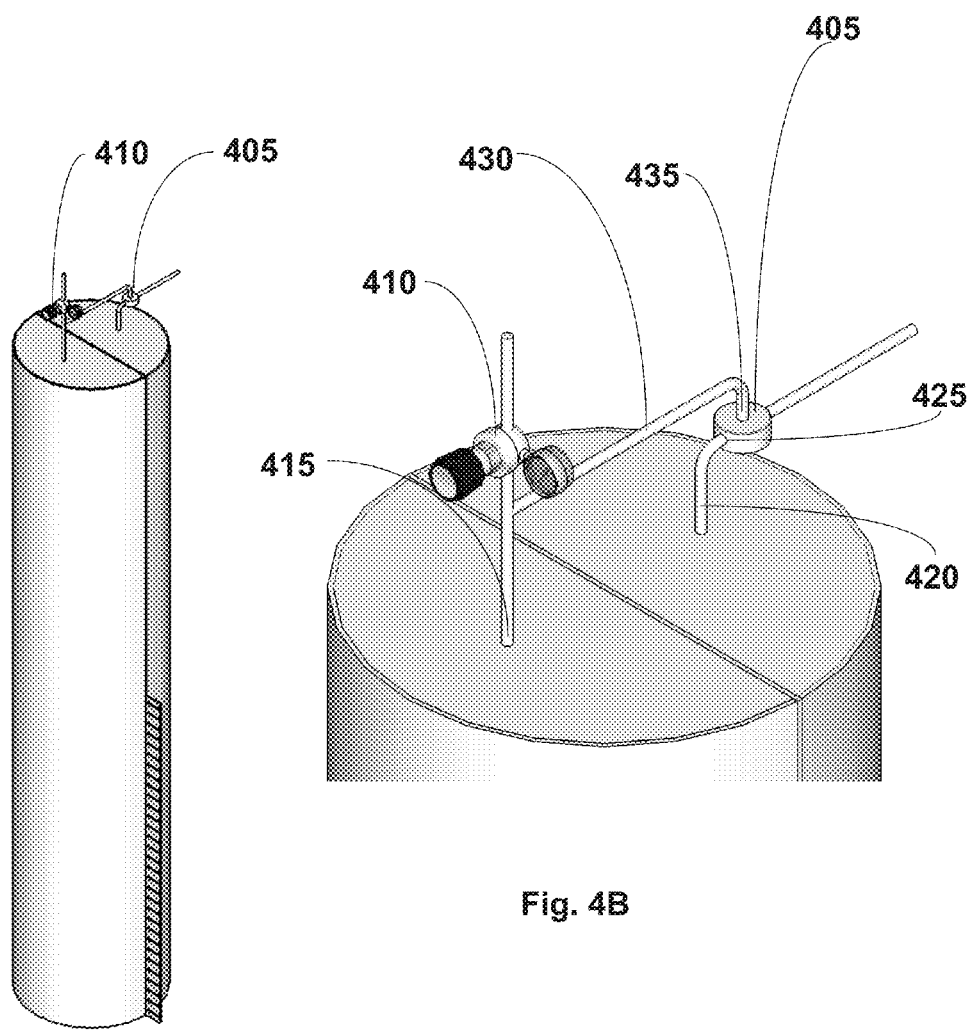
FIGS. 4A and 4B show top perspective views of an embodiment of an electrolyzer apparatus comprising a back pressure regulator in a second compartment of an apparatus that references the pressure in a first compartment of the apparatus.

FIG. 4A shows a top perspective view of an embodiment of an electrolyzer apparatus comprising a back pressure regulator 405 for a second compartment in the apparatus that references the pressure in a first compartment of the apparatus as the pressure set point for the pressure in the second compartment. FIG. 4B is a detailed top perspective view of the apparatus showing second compartment back pressure regulator 405, first compartment back pressure regulator 410, first compartment gas removal pipe 415 that communicates with back pressure regulator 410, second compartment gas removal pipe 420 that communicates with back pressure regulator 405, pipe 430 that communicates the value of the pressure in the first compartment of the apparatus to the reference input port 435 of the back pressure regulator 405 whereby the pressure in the second compartment and the pressure in the first compartment of the electrolysis apparatus are substantially equal.

Figure 5:
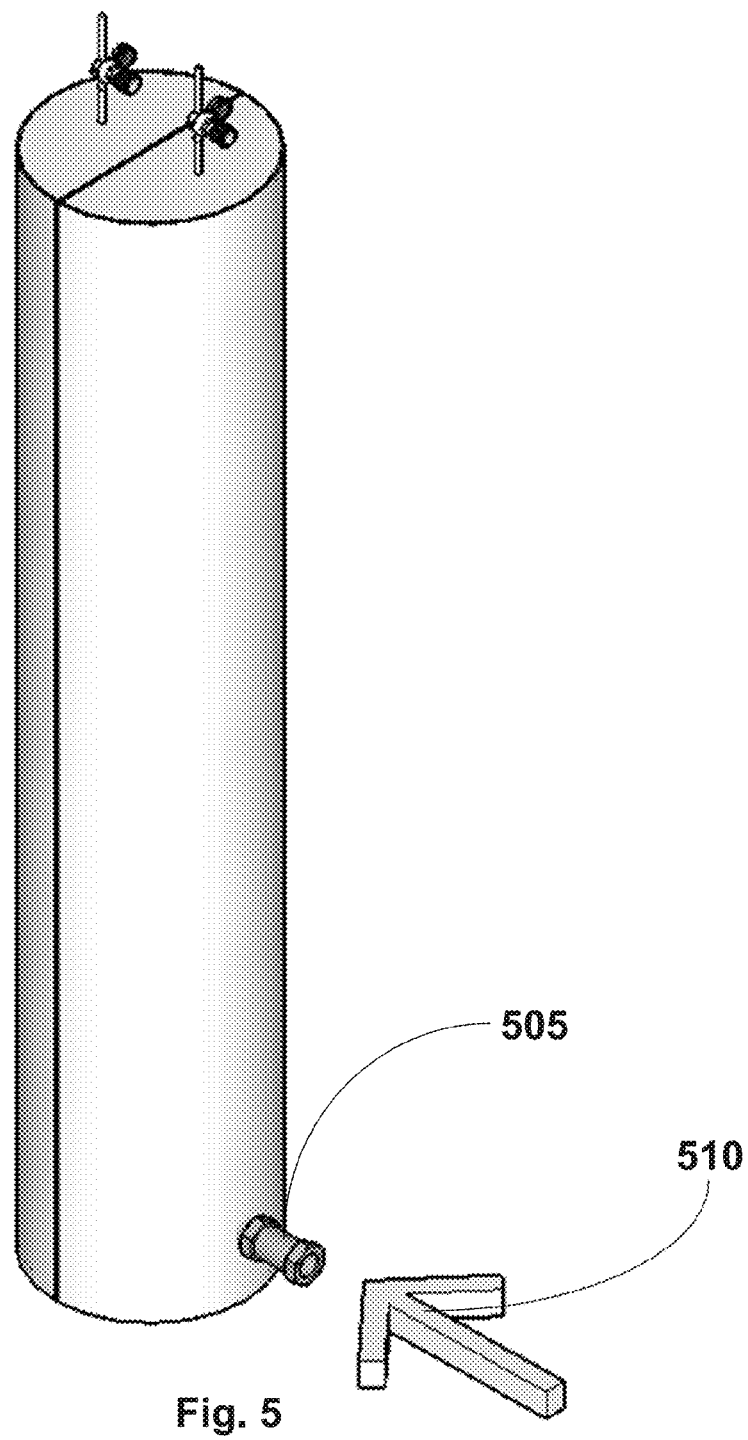
FIG. 5 shows a top perspective view of an embodiment of an electrolyzer apparatus comprising a one-way valve.

FIG. 5 shows a top perspective view of an embodiment of an electrolysis apparatus comprising a one-way valve 505. Arrow 510 indicates the direction of water flow into the apparatus when the external pressure exceeds a set point.

Figures 6A, 6B:
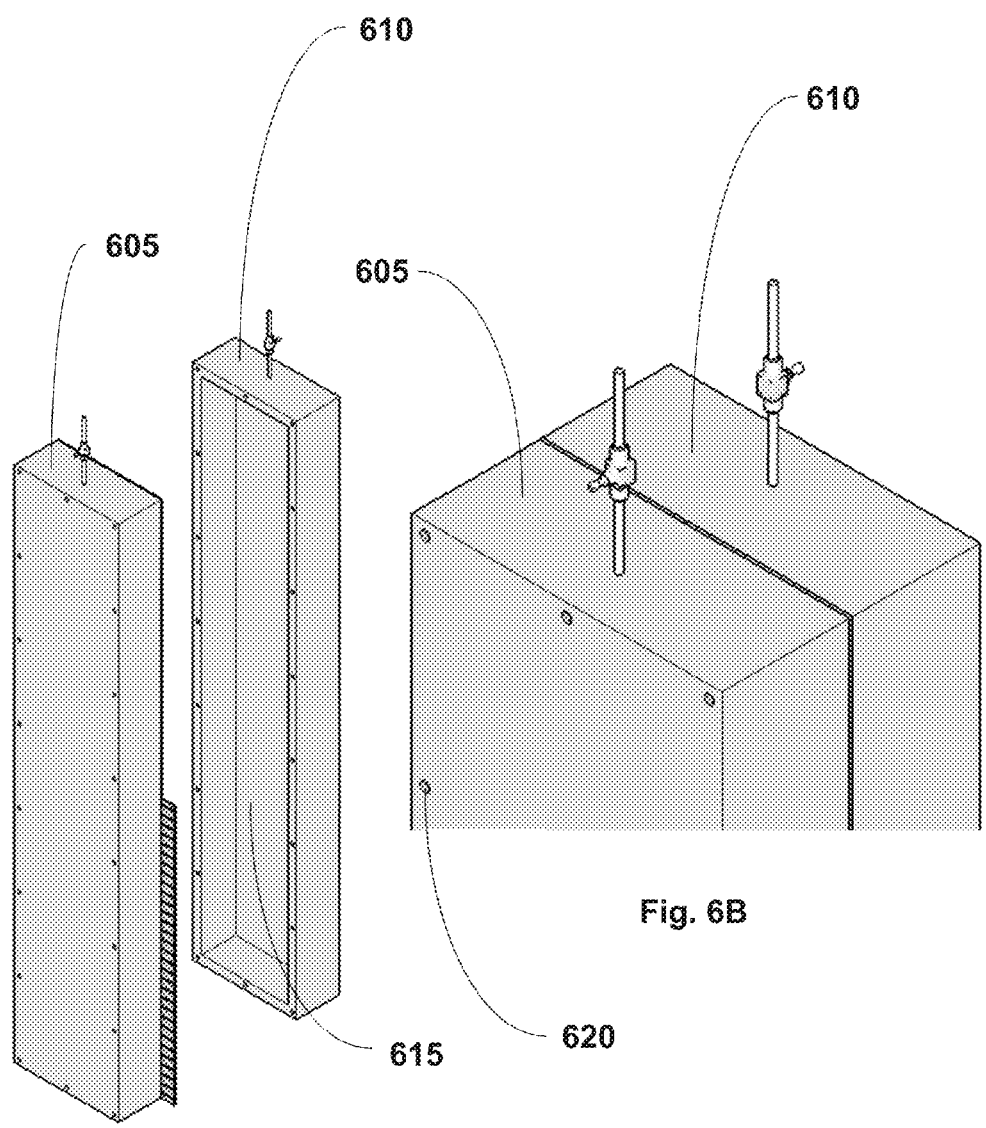
FIGS. 6A-6D show top (FIGS. 6A and 6B) and bottom (FIGS. 6C and 6D) perspective views of an embodiment of an electrolyzer apparatus comprising substantially rectangular hemi-enclosures.
Figure 6C:
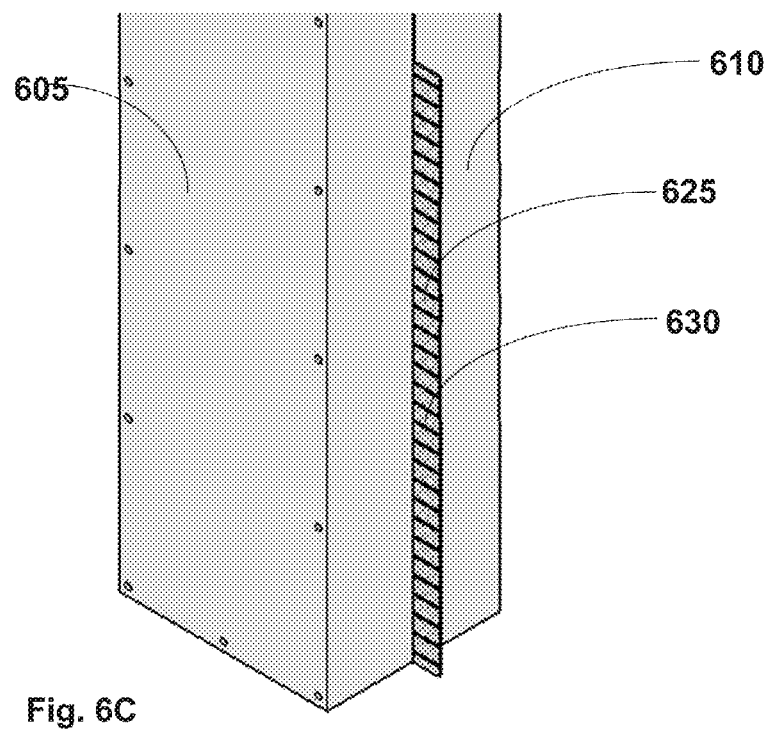
Figure 6D:
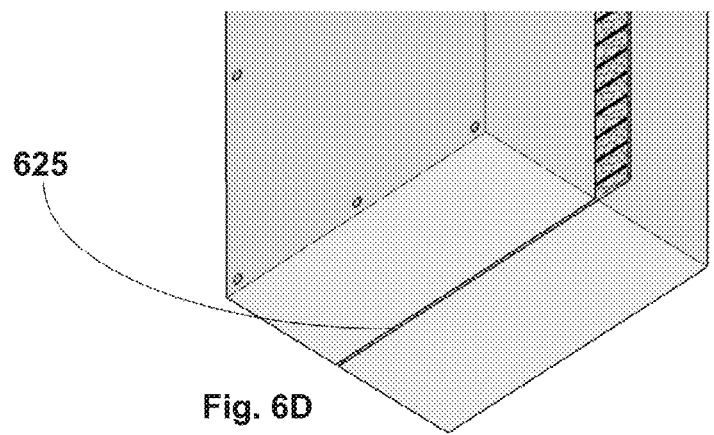

FIG. 6A shows a partially exploded top perspective view of an embodiment of an electrolysis apparatus that is comprised of substantially rectangular first hemi-enclosure 605 and substantially rectangular second hemi-enclosure 610. Interior cavity 615 for second hemi-enclosure 610 is visible in FIG. 6A. A similar interior cavity for first hemi-enclosure 605 is present, but not visible in FIG. 6A. FIG. 6B is a detailed top perspective view of the assembled apparatus showing first hemi-enclosure 605, second hemi-enclosure 610 and assembly clearance holes 620. Multiple methods are available for fastening the electrolysis apparatus including bolts, nuts, gaskets and clearance holes 620. FIG. 6C shows a lower region detailed perspective of an embodiment of an electrolysis apparatus including diaphragm 625 and one or more electrodes 630. FIG. 6D shows a detailed bottom perspective view of an embodiment of an electrolysis apparatus.

FIG. 7A shows a top perspective exploded view of an embodiment of an electrolysis apparatus comprising headspace barrier 705, water fill mark 710, diaphragm electrode array 715, and headspace barrier top edge 730. FIG. 7B shows a detailed view of an embodiment of a headspace barrier and a diaphragm electrode array comprising headspace barrier 705, interface 720 and diaphragm top edge 725. The water fill mark 710 of the headspace barrier 705 is typically between the interface 720 defined by the abutting bottom edge of the barrier and top edge 725 of the diaphragm and the top edge 730 of the headspace barrier.

Figures 8A, 8B:
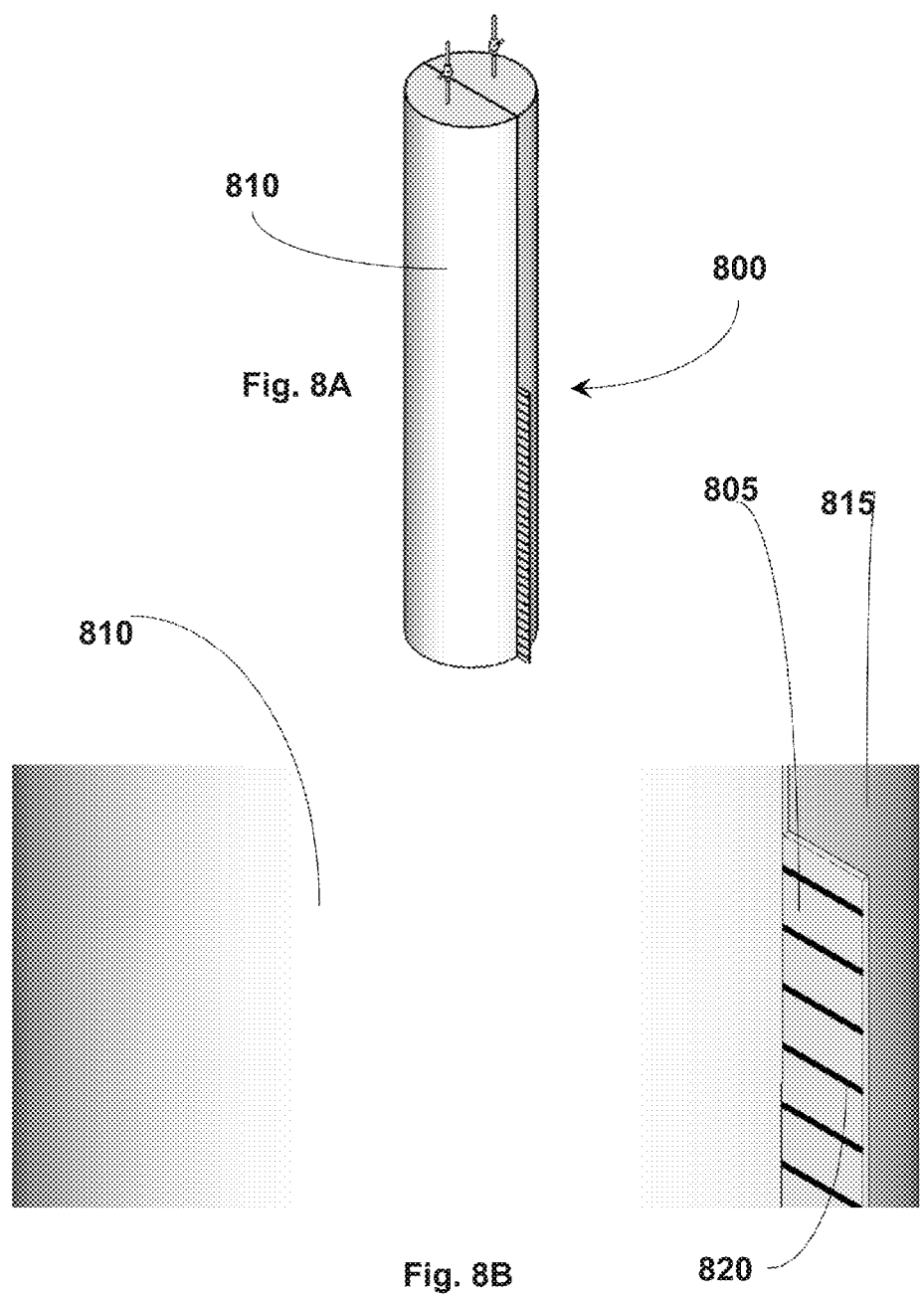
FIGS. 8A-8C show a perspective assembled view of an embodiment of an electrolysis apparatus (FIG. 8A) and a detailed view (FIGS. 8B and 8C) of one edge of an embodiment of a diaphragm that is fastened to a strip that is impermeable to gas, water and ions.
Figure 8C:
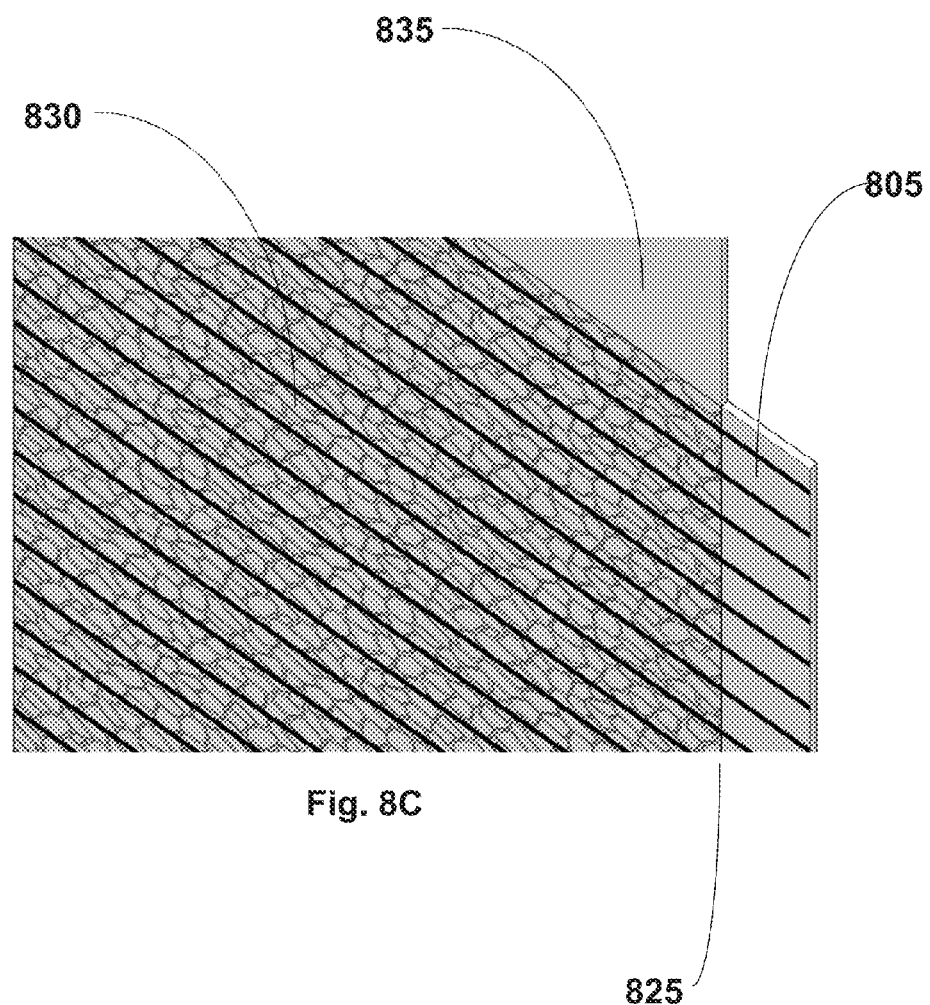

FIG. 8A shows a top perspective assembled view of an embodiment of an electrolysis apparatus 800 wherein at least one of the edges of the diaphragm is fastened to a strip that is impermeable to gas, water and ions. FIG. 8B shows impermeable strip 805, first hemi-enclosure 810, second hemi-enclosure 815 and one or more electrodes 820. FIG. 8C shows a further detailed perspective view of an embodiment with the hemi-enclosures removed comprising interface 825. Interface 825 is the interface defined by an edge of the fastened impermeable strip 805 and the at least one of the edges of the diaphragm 830. Headspace barrier 835 is also illustrated.

Figure 9A:
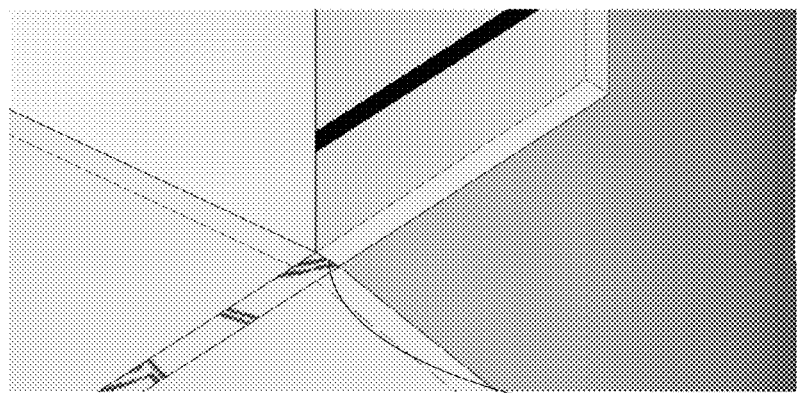
FIGS. 9A-9C show detailed bottom assembled perspective views of examples of embodiments of alternate locations for fastening an impermeable strip to one edge of a diaphragm.
Figure 9B:
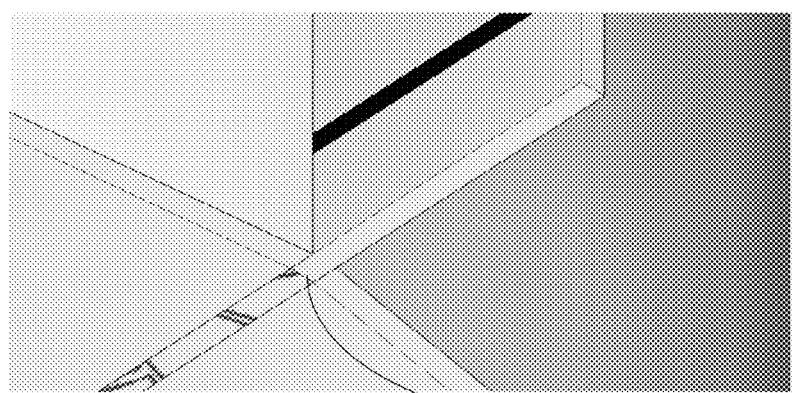
Figure 9C:
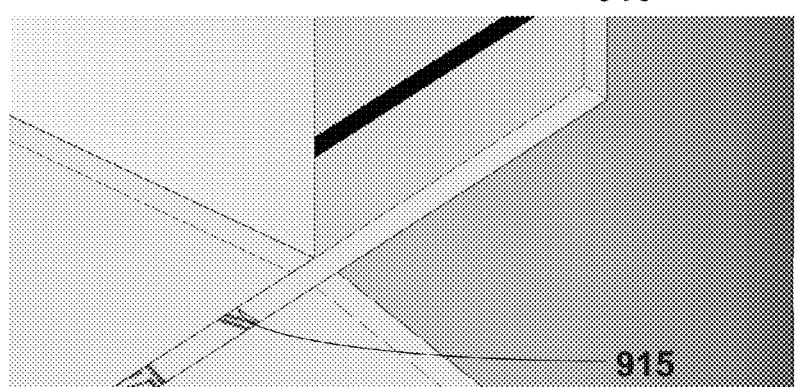

FIG. 9 shows embodiments of detailed bottom perspective views of FIG. 8A. FIG. 9A shows an embodiment of fastening an impermeable strip to at least one edge of a diaphragm at location 905, wherein location 905 is at the periphery of an outer wall of a hemi-enclosure. FIG. 9B shows an embodiment of fastening an impermeable strip to at least one edge of a diaphragm at location 910, wherein location 910 is at the periphery of an inner wall of a hemi-enclosure. FIG. 9C shows an embodiment of fastening an impermeable strip to at least one edge of a diaphragm at location 915, wherein location 915 is internal to the electrolysis apparatus and removed from the periphery of an inner wall of a hemi-enclosure.

Figure 10C:
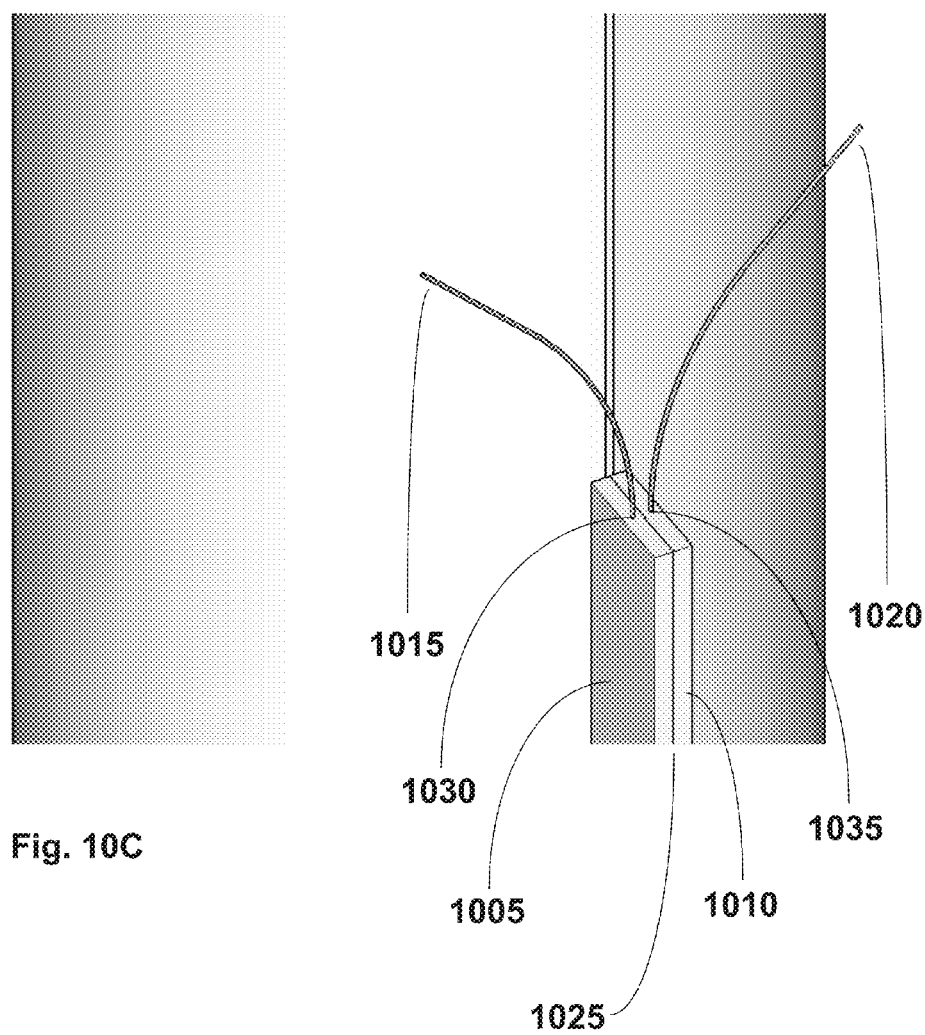

FIG. 10A shows an embodiment of a top perspective exploded view wherein first leak tight electric contact seal 1005 and second leak tight electric seal 1010 are used to make leak tight electric contact with an electrolyzer apparatus using first electric lead 1015 and second electric lead 1020. FIG. 10B is an assembled view of FIG. 10A. FIG. 10C is a detailed perspective view of the leak tight seals and electrical leads further illustrating leak tight interface 1025 defined by fastened first seal 1005 and second seal 1010. Feedthroughs 1030 and 1035 for electrical leads 1015 and 1020 are leak tight.

Figure 11A:
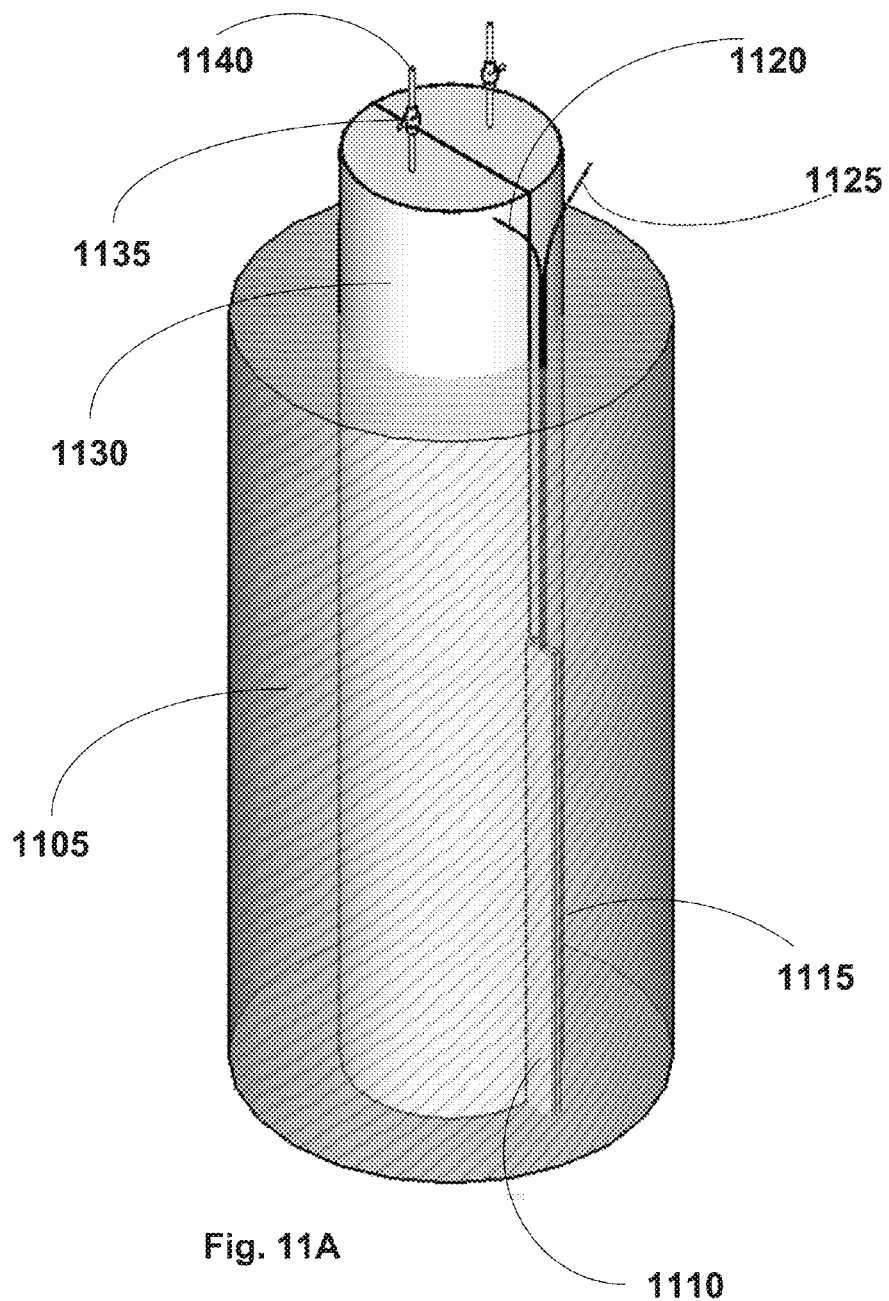

FIG. 11A shows an embodiment of a view of an electrolyzer apparatus that is surrounded by water 1105 comprising first leak tight electric contact seal 1110, second leak tight electric contact seal 1115, first electric contact lead 1120, second electric contact lead 1125, first hemi-enclosure 1130, first back pressure regulator 1135, and first gas removal pipe 1140. FIG. 11B shows an embodiment of a further view of FIG. 11A with first hemi-enclosure 1130 removed, first back pressure regulator 1135 removed and first pipe 1140 removed. FIG. 11B further illustrates headspace barrier 1145 and diaphragm electrode array 1150. The electrodes project beyond the apparatus and into the sealed leak tight electrical contact compartment formed by fastening first and second leak tight electric contact seals 1110 and 1115, respectively.

Figure 12A:
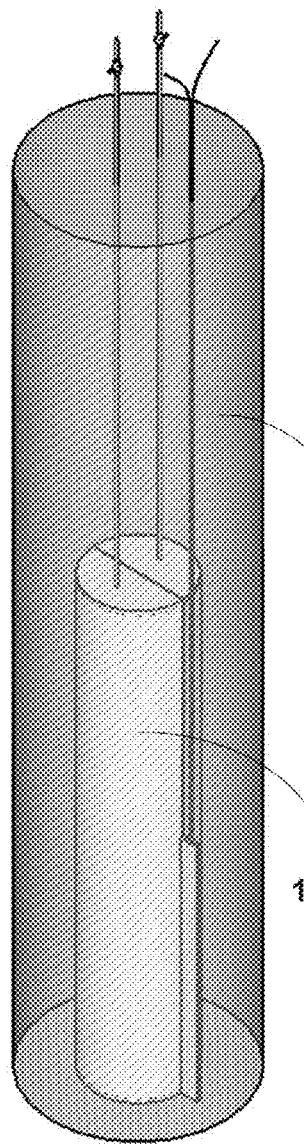
FIGS. 12A and 12B show views of an embodiment of an electrolyzer apparatus that is submerged in water.
Figure 12B:
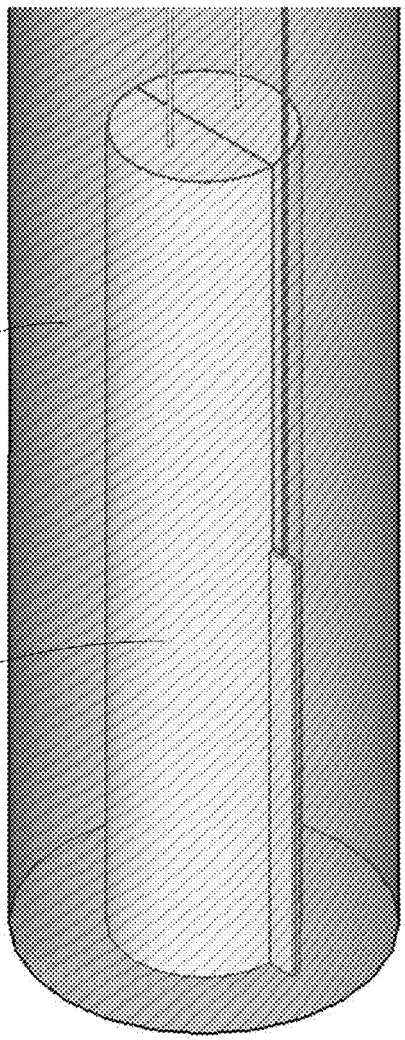

FIG. 12A shows an embodiment of a top perspective view of an electrolyzer apparatus comprising first hemi-enclosure 1210 that is submerged in water 1205. FIG. 12B is a detailed view of FIG. 12A.

Figures 13A, 13B:
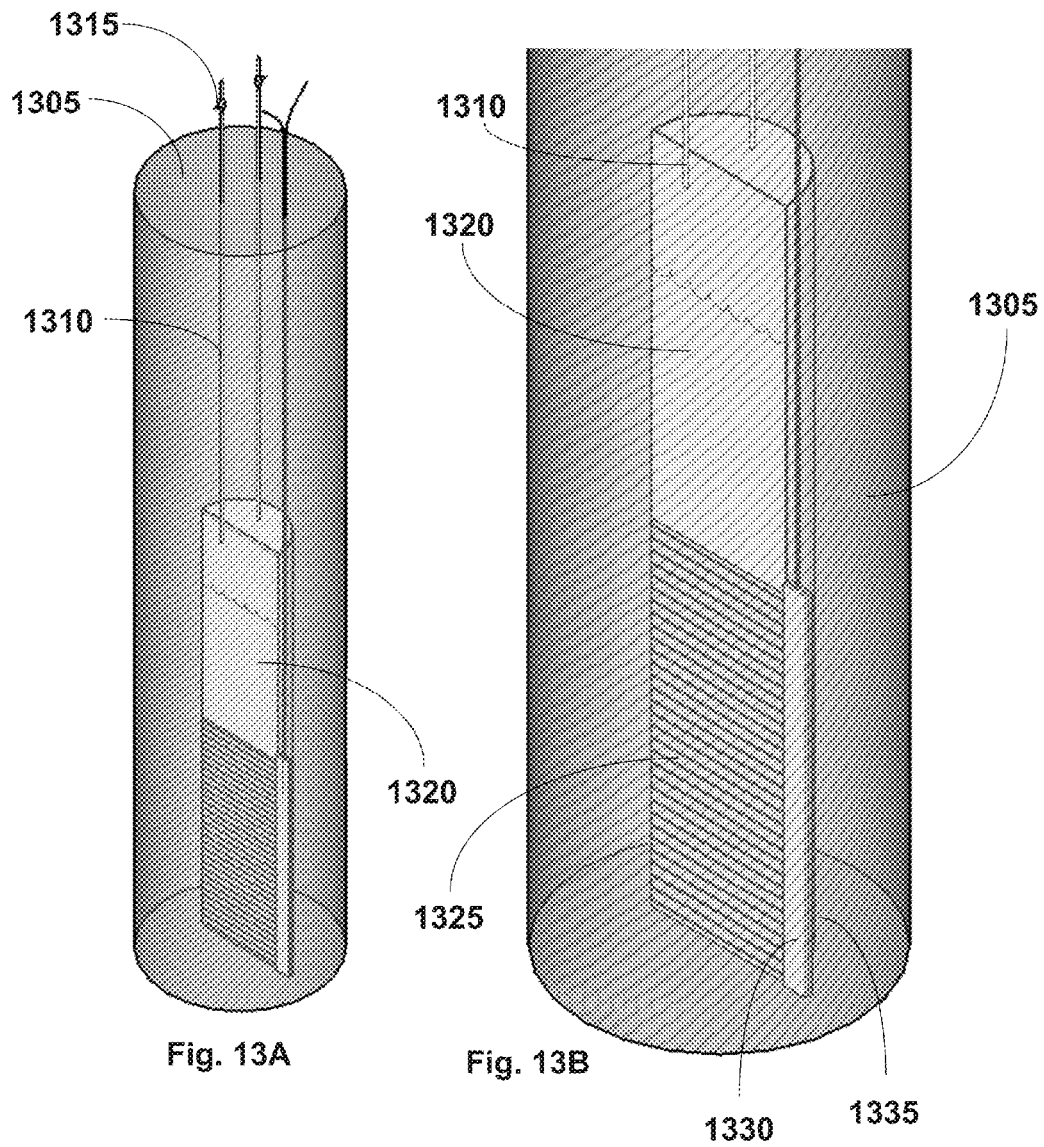
FIGS. 13A and 13B show views of an embodiment of an electrolyzer apparatus that is submerged in water with a first hemi-enclosure removed.

FIG. 13A shows an embodiment of a top perspective view of an electrolyzer apparatus with a first hemi-enclosure removed that is submerged in water 1305 and includes first gas removal pipe 1310 that communicates with first back pressure regulator 1315. FIG. 13B is a detailed view of the lower part of FIG. 13A including headspace barrier 1320, diaphragm electrode array 1325, first leak tight electrode contact cover plate 1330 and second leak tight electrode contact cover plate 1335.

Figures 14A, 14B:
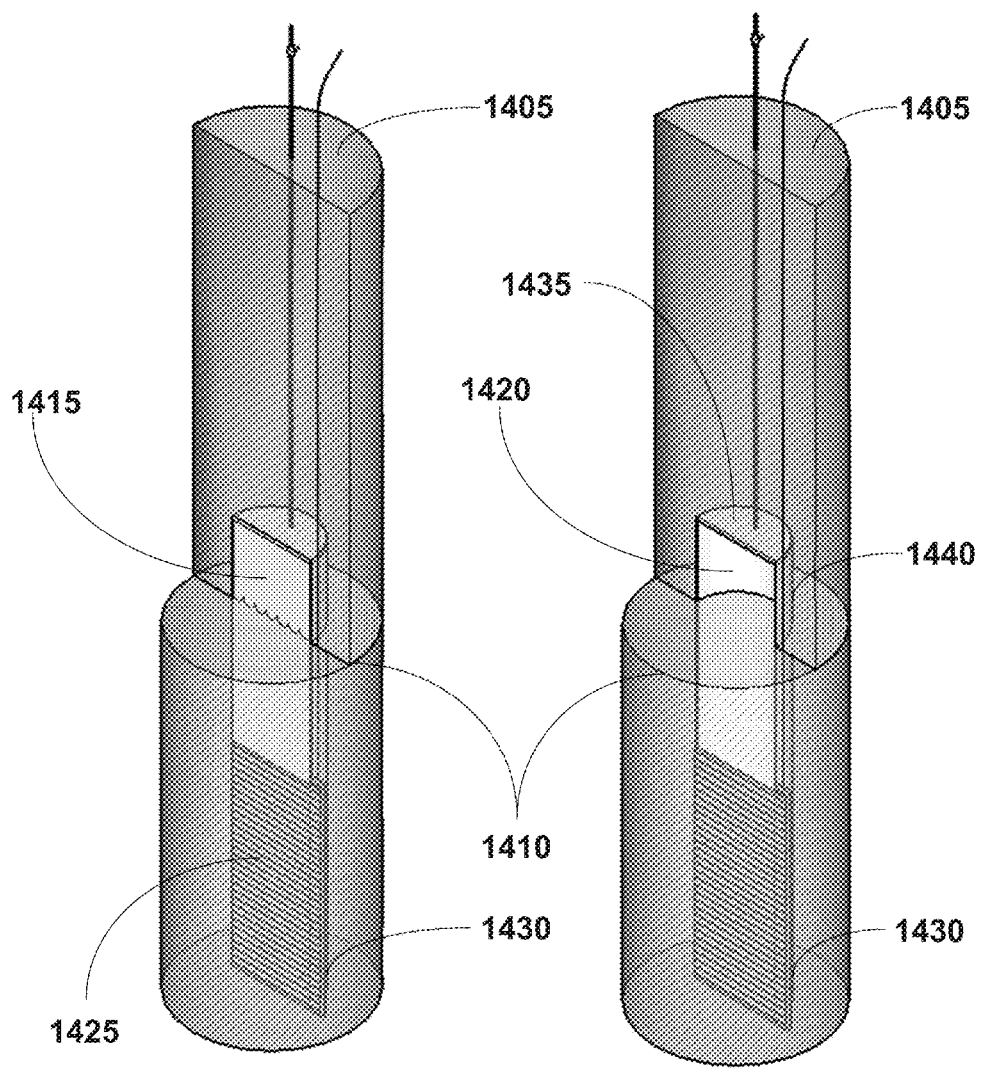
FIGS. 14A and 14B show views of an embodiment of an electrolyzer apparatus that is submerged in water with a first hemi-enclosure, first pipe and first electrical contact wire removed and a further view with a headspace barrier removed.

FIG. 14A shows an embodiment of a view of an electrolyzer apparatus that is submerged in water with the following elements removed: a first hemi-enclosure, a first gas removal pipe, a first top cover plate and a first half of a water column above a fill region. FIG. 14A further shows a second half of water column 1405 above fill region 1410, headspace barrier 1415, diaphragm electrode array 1425 and leak tight electric contact seal 1430. FIG. 14B is the same view as 14A with further removal of headspace barrier 1415 thereby providing a view of a second compartment containing gas 1420 of second hemi-enclosure 1440 with top plate 1435.

Figure 15A:
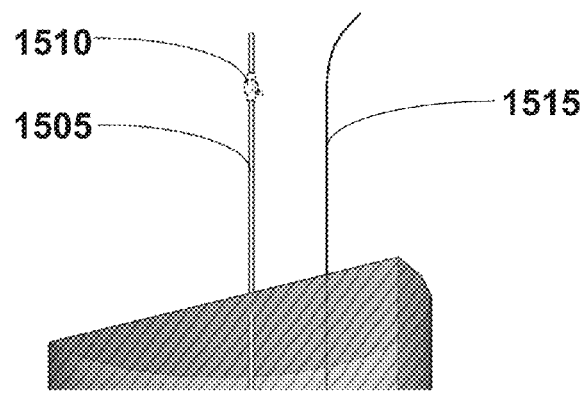
FIGS. 15A and 15B show a perspective view of an embodiment of a second gas removal pipe and second electrical contact wire emerging from the surface of water and a perspective view of a second compartment in an embodiment of an electrolysis apparatus.
Figure 15B:
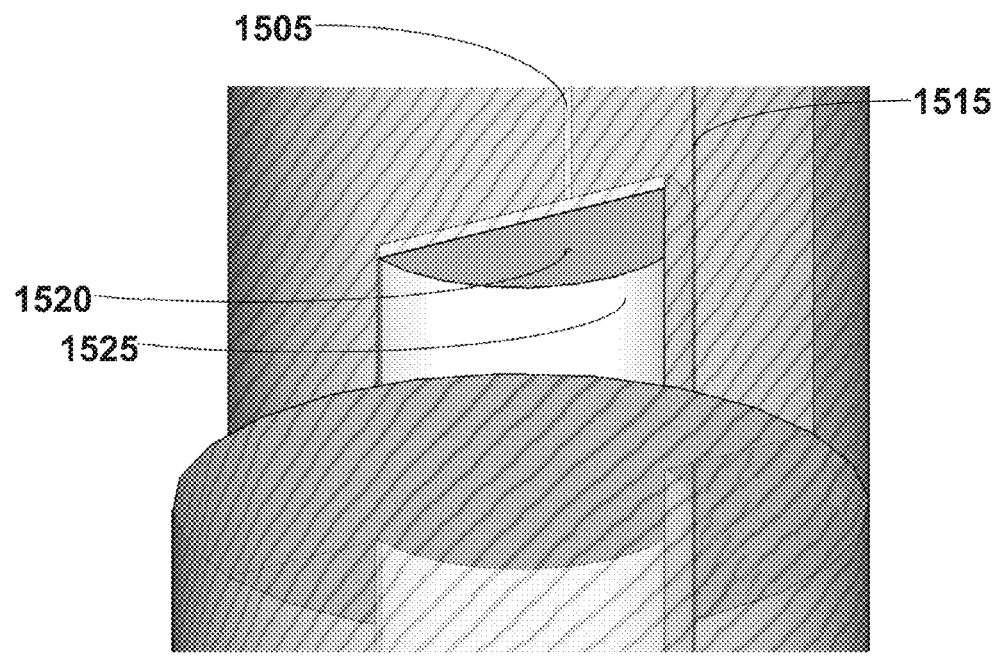

FIG. 15A shows a detailed perspective view of an embodiment of second gas removal pipe 1505, second back pressure regulator 1510 and second electrical contact wire 1515 emerging from the surface of water. FIG. 15B is a detailed perspective view of an embodiment of a second compartment showing gas removal opening 1520 communicating with gas removal pipe 1505 for gas in compartment 1525 in a second hemi-enclosure.

Figures 16A, 16B:
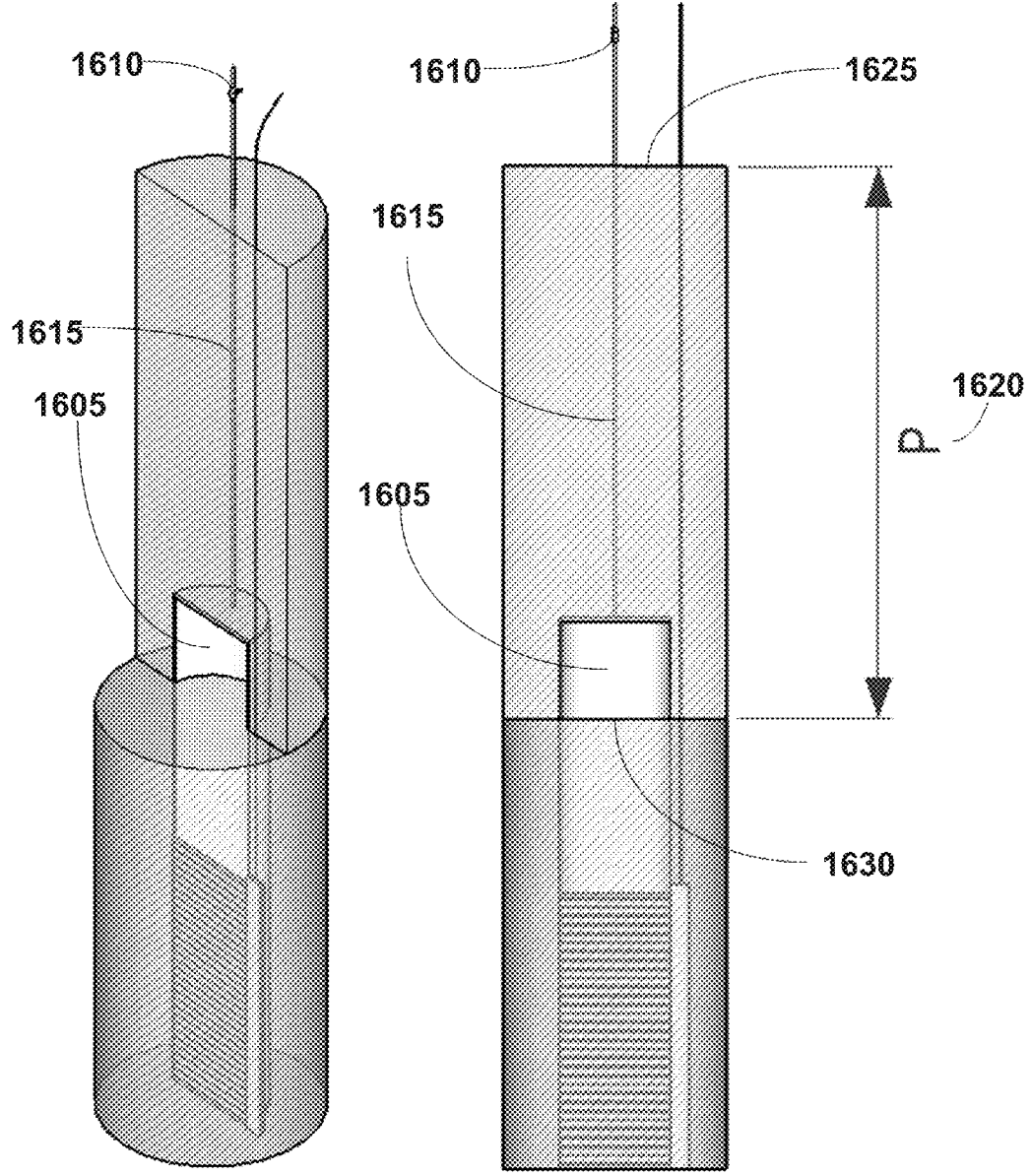
FIGS. 16A and 16B show a top perspective view and a front elevation view of a method of pressurizing gas in a second compartment of an embodiment of a second hemi-enclosure.

FIG. 16A shows a perspective view and FIG. 16B shows a front elevation view of embodiments of a method for pressurizing a compartment of an electrolysis apparatus that is surrounded by water. FIG. 16 comprises gas in a second compartment 1605, of a second hemi-enclosure, back pressure regulator 1610 that communicates via pipe 1615 with the gas 1605 in the second compartment. FIG. 16 further shows pressure P 1620 that is the difference between water level 1625 and water level 1630. Gas in a first compartment of a first hemi-enclosure is present but not illustrated in FIG. 16.

FIG. 17A shows an exploded view of an embodiment of leak tight electric contact seals for an electrolysis apparatus. FIG. 17B is a detailed view of FIG. 17A showing first leak tight electric contact seal 1705, second leak tight electric contact seal 1710, first electric contact lead 1715, second electric contact lead 1720, first leak tight electric feed-through 1725, second leak tight electric feed-through 1730, support surface 1735 for one or more electrodes 1740. The support surface may be an extension of the diaphragm material or a fastened material that is impermeable to ions, gas and water. Electrically conductive material 1745 may line, occupy or fill the interior of second seal 1710. A similar material, not visible in FIG. 17 may occupy or fill the first seal 1705.

Figures 18A, 18B:
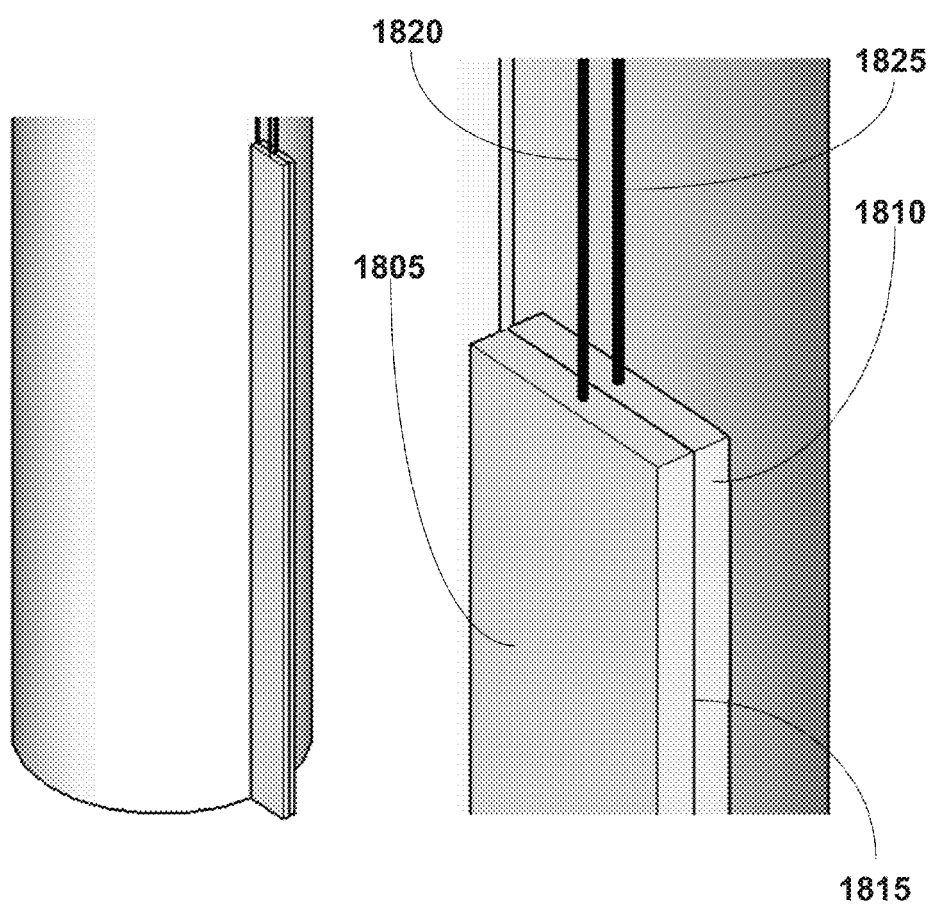
FIGS. 18A and 18B show assembled views of an embodiment of water-tight electric contact seals for an embodiment of an electrolysis apparatus.

FIG. 18 is an assembled view of FIG. 17 that shows views of an embodiment of leak tight electric contact seals for an electrolysis apparatus including first seal 1805, second seal 1810, leak tight seam 1815, formed by fastening first seal 1805 and second seal 1810, first electric contact lead 1820, and second electric contact lead 1825.

Figure 19A:
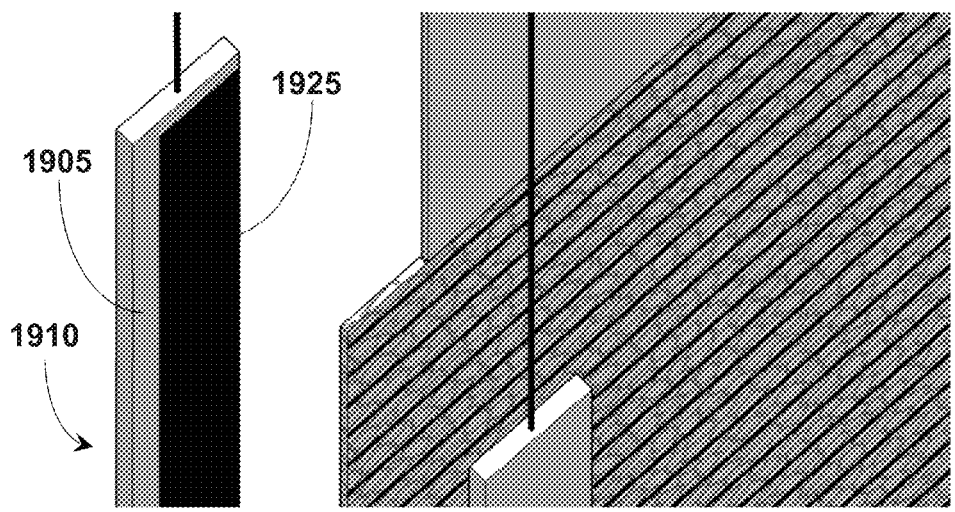
FIGS. 19A and 19B show opposing detailed exploded views of an embodiment of water-tight electric contact seals for an embodiment of an electrolysis apparatus.
Figure 19B:
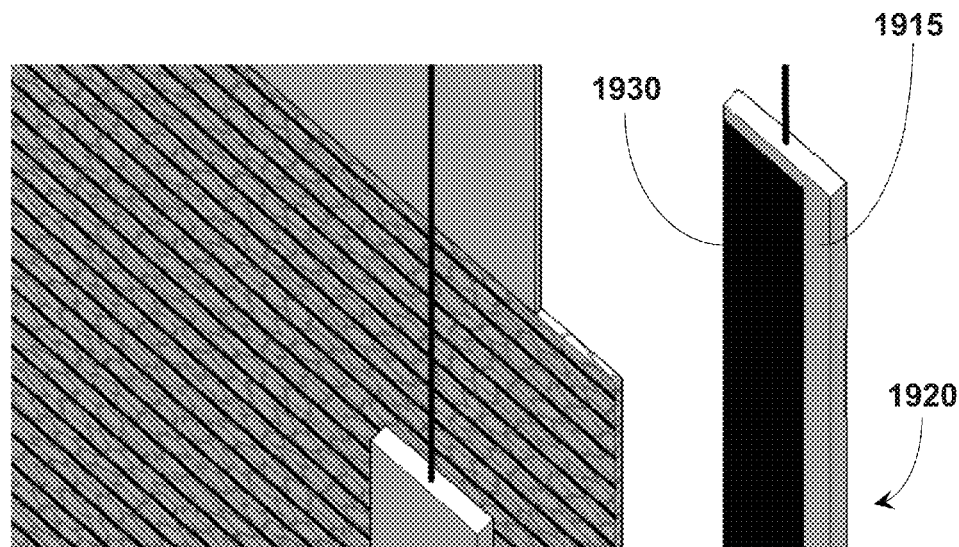

FIGS. 19A and 19B show opposing exploded views of mating edges 1905 and 1915 of embodiments of first leak tight electrical contact seal 1910 and second leak tight electric contact seal 1920 for an electrolysis apparatus. Electrically conductive materials 1925 and 1930 may fill the contact compartments and may make electrical contact with the electrode contacts of the diaphragm electrode array.

Figure 20A:
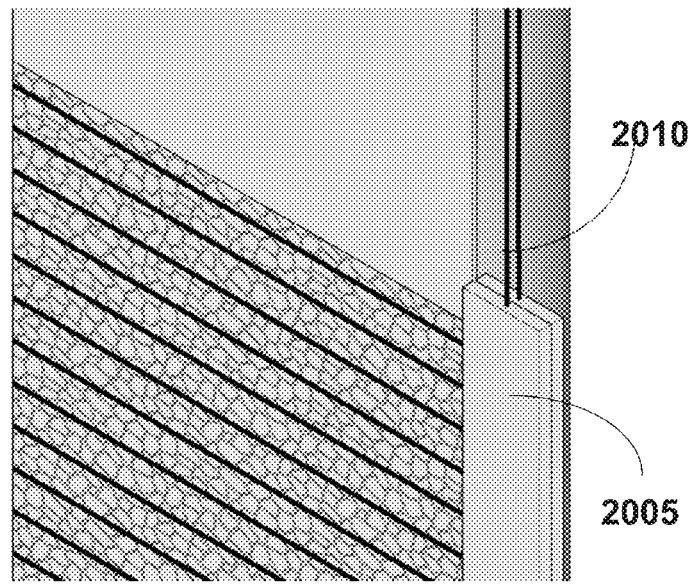
FIGS. 20A and 20B show detailed assembled views of an embodiment of water-tight electric contact seals for an embodiment of an electrolysis apparatus with a first hemi-enclosure removed and a further view with a first seal removed.
Figure 20B:
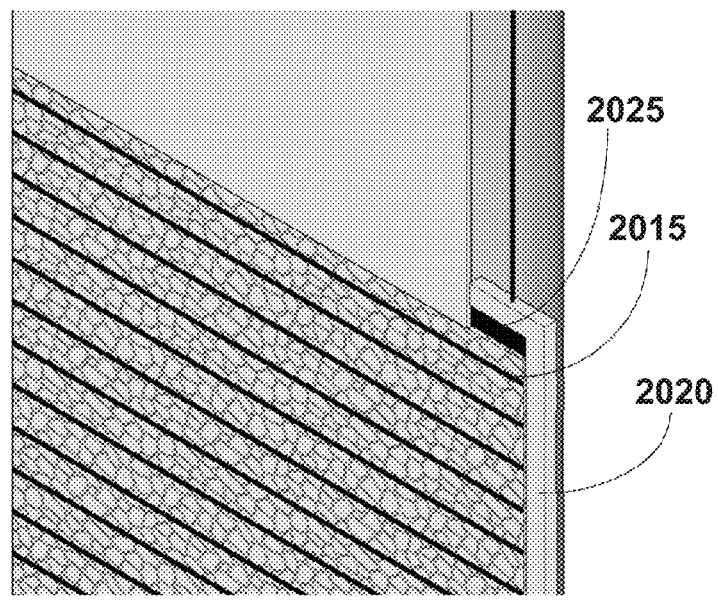

FIG. 20A shows a detailed perspective view of an embodiment of leak tight electric contact seals. FIG. 20B shows an embodiment of removal of a first electric contact seal cover plate and a first electric contact lead. FIG. 20A comprises first leak tight seal 2005 and first electric lead 2010. FIG. 20B comprises one or more electrode contacts 2015 that are inserted in second seal 2020. The electric seals may include electrically conductive materials 2025 that fill and make electrical contact with the one or more electrode contacts 2015.

FIG. 21A shows an embodiment of an overall top perspective view of a diaphragm electrode array, headspace barrier, electric contact leads and water tight electric seal assembly 2105. FIG. 21B is a detailed top perspective view of an embodiment of the leak tight electric contact leads and feedthroughs. FIG. 21C is a detailed bottom perspective view of an embodiment of leak tight electric contact seals for the electrolysis apparatus.

Figures 22A, 22B:
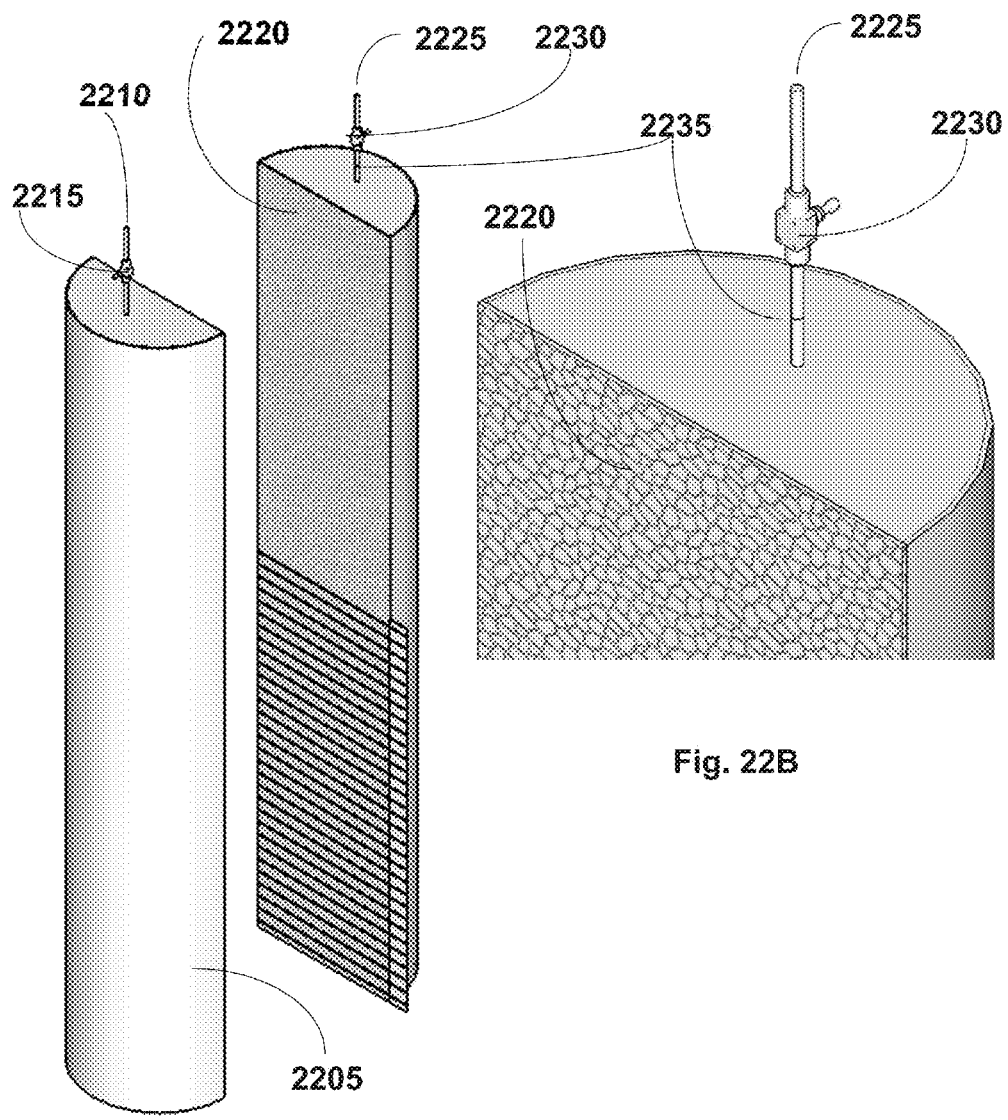
FIGS. 22A-22C show top perspective views of a water level in an embodiment of a second gas removal pipe and a front elevation view (FIG. 22D) showing an embodiment of a method of pressurizing gas in the pipe.
Figure 22C:
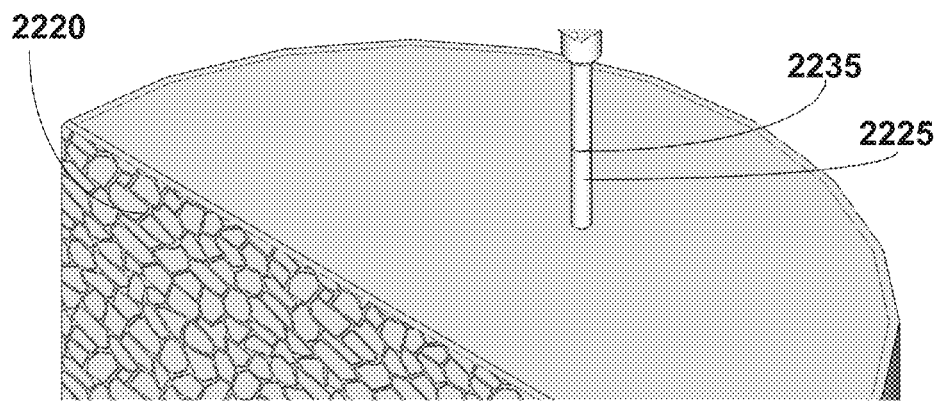
Figure 22D:
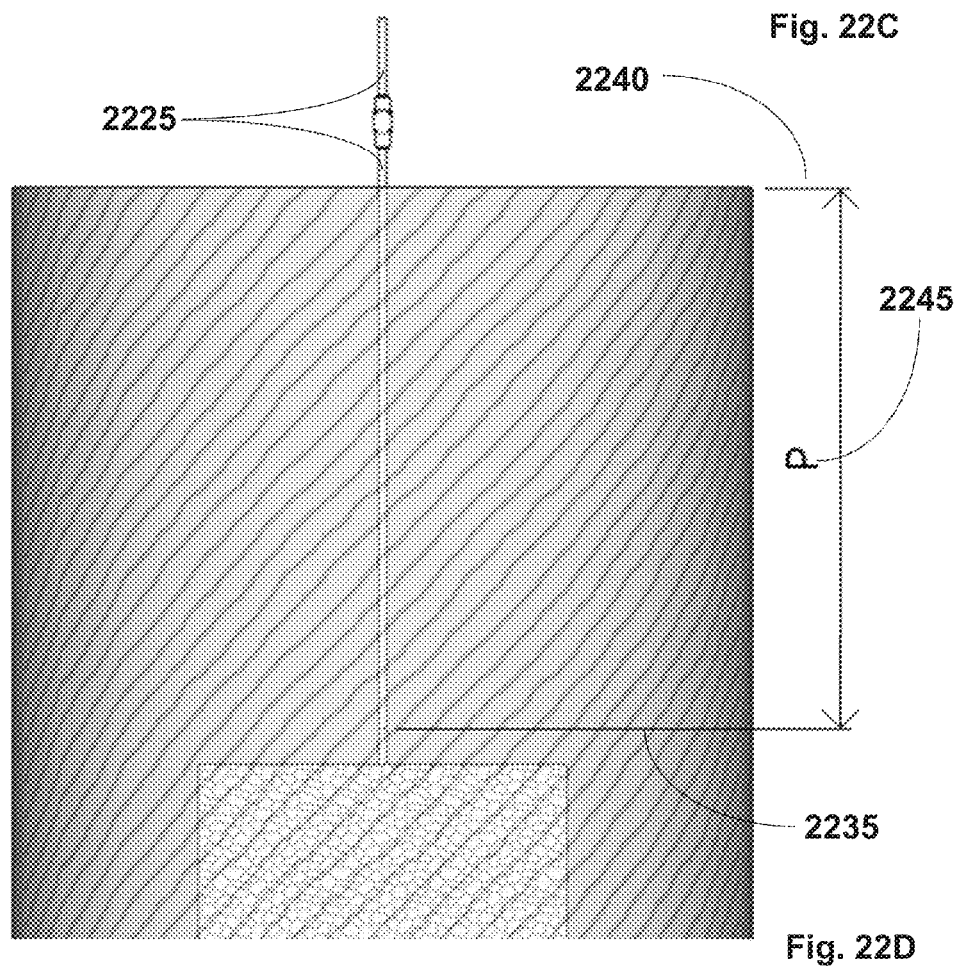

FIG. 22A is a partially exploded view showing a top perspective view of an electrolysis apparatus without a headspace barrier comprising first hemi-enclosure 2205, first gas removal pipe 2210, first back pressure regulator 2215, diaphragm 2220, second gas removal pipe 2225, second back pressure regulator 2230 and a water level 2235 in second gas removal pipe 2225. FIG. 22B is a detailed top view of FIG. 22A showing diaphragm 2220, second gas removal pipe 2225, second back pressure regulator 2230 and water level 2235 in second gas removal pipe 2225. FIG. 22C is a detailed view of the water level 2235 in second gas removal pipe 2225. FIG. 22D shows a detailed front elevation view of an embodiment of an electrolysis apparatus submerged in water and a method for applying pressure to gas above water level 2235 in second gas removal pipe 2225. FIG. 22D further shows pressure P 2245 that is the difference in water height between water level 2235 and water level 2240. The first gas removal pipe 2210 has its own water level which is not illustrated in FIG. 22.

Figures 23A, 23B:
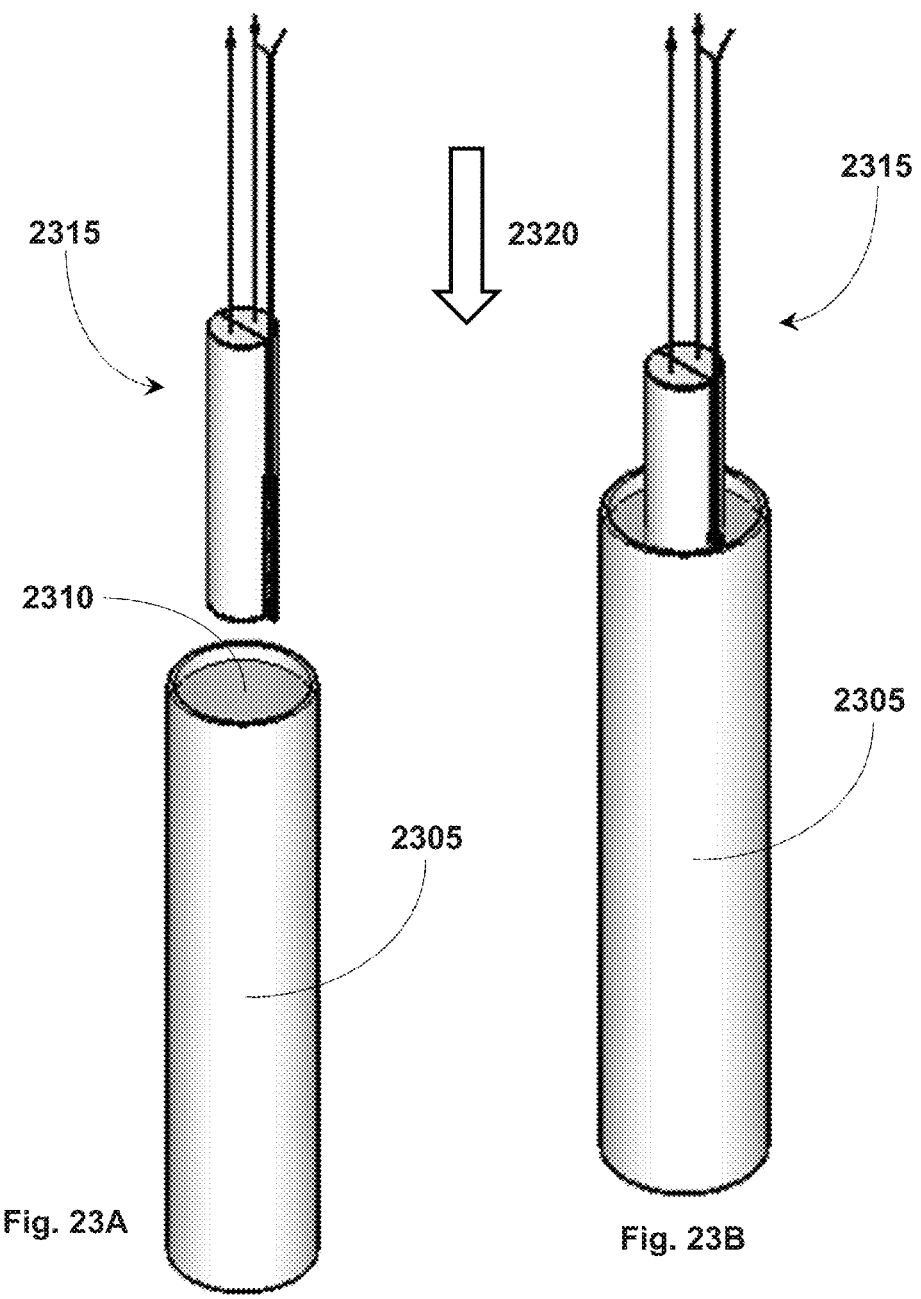
FIGS. 23A-23C show top perspective views of an embodiment of an electrolysis apparatus above and partially submerged in a water-containing vessel.
Figure 23C:
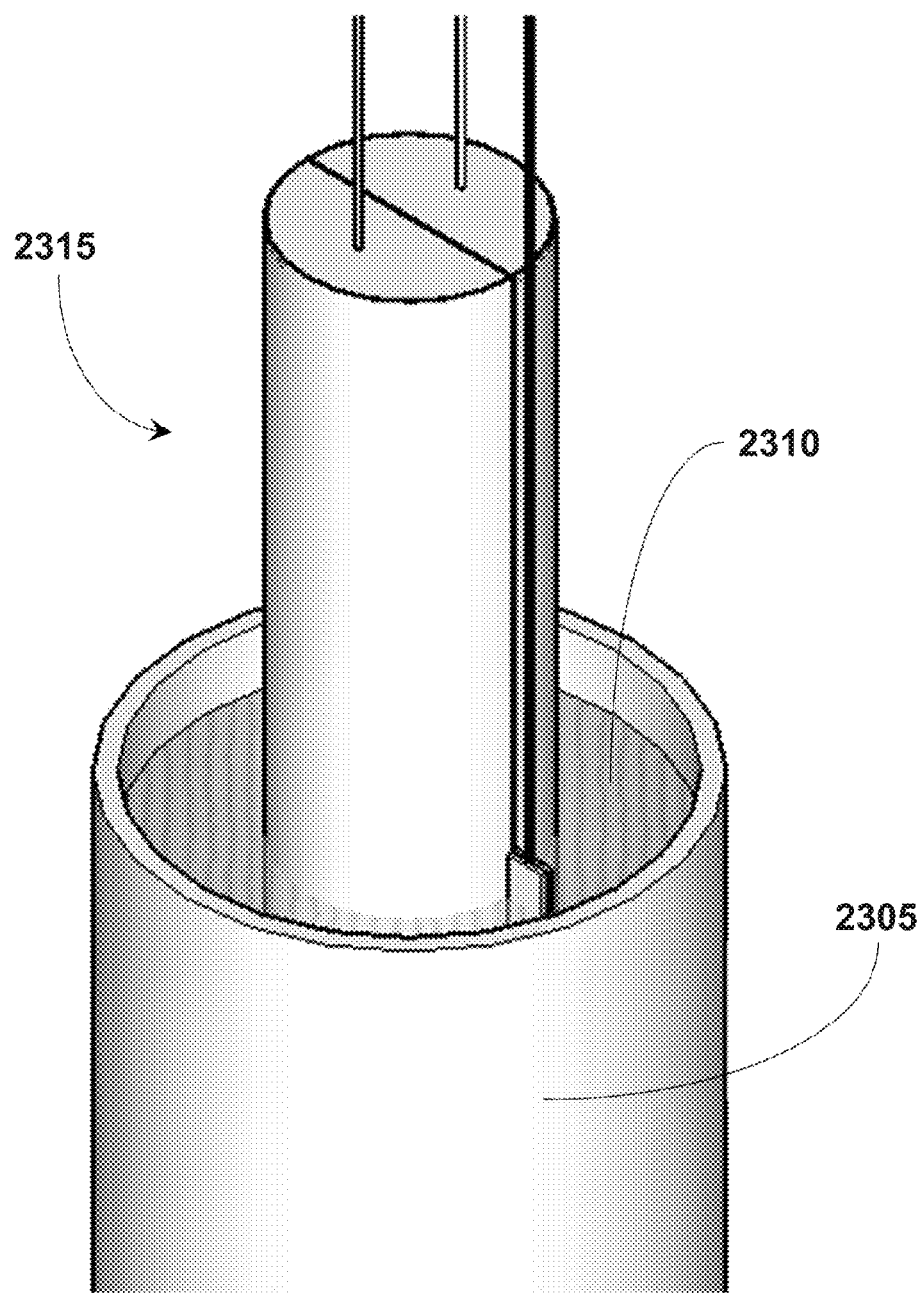

FIG. 23A shows a top perspective view of an embodiment of an electrolysis apparatus 2315 above a water level 2310 of water in vessel 2305. FIG. 23B shows a movement arrow 2320 and a top perspective view of an embodiment of an electrolysis apparatus 2315 partially submerged in water-containing vessel 2305. FIG. 23C is a detailed top view of FIG. 23B.

Figure 24B:
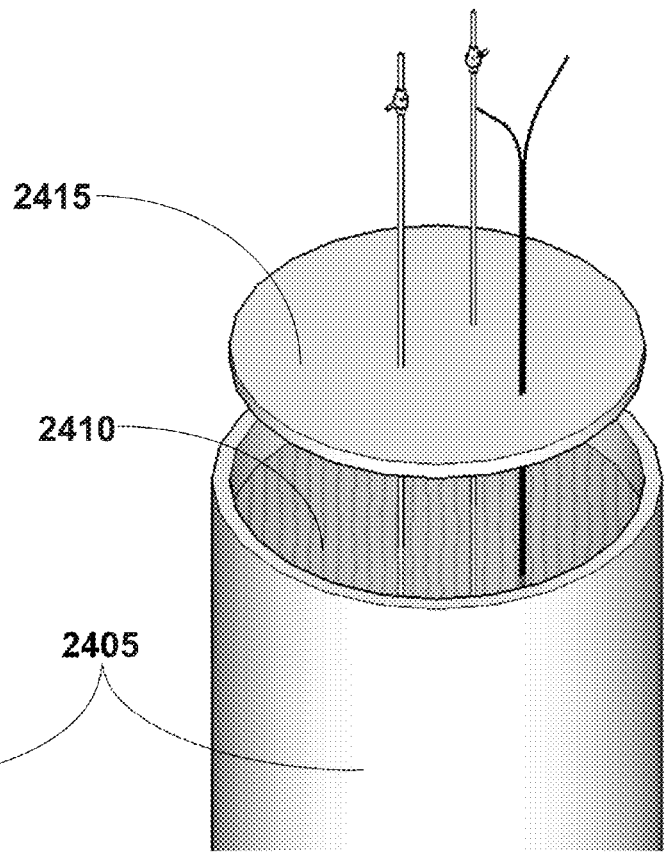
FIGS. 24A and 24B show top perspective views of an embodiment of an electrolysis apparatus submerged in a water-containing vessel with the plate removed.
Figure 24A:
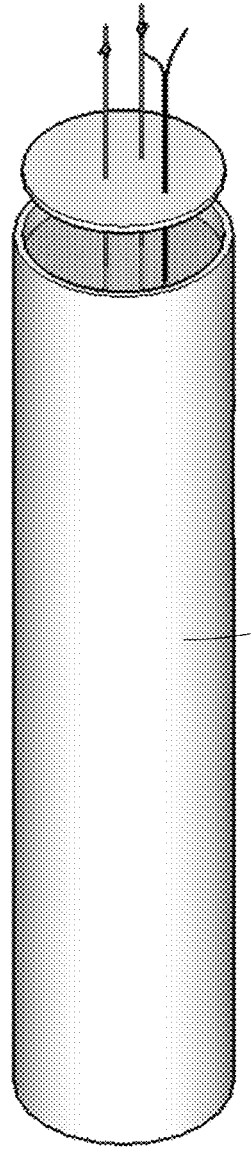

FIG. 24A shows a top perspective view of an embodiment of an electrolysis apparatus submerged in a water-containing vessel 2405 comprising water level 2410 and top cover plate 2415 above the vessel. FIG. 24B is a detailed top view of FIG. 24A.

FIG. 25A shows a top perspective view of an embodiment of an electrolysis apparatus submerged in a sealed water-containing vessel 2505 with a top cover plate attached. FIG. 25B is a top detailed view of FIG. 25A comprising water-containing vessel 2505, top cover plate 2510 that is leak-tight fastened to the water-containing vessel 2505, first gas removal pipe 2515, first leak tight feedthrough 2520 for the first gas removal pipe 2515, second gas removal pipe 2525, second leak tight feedthrough 2530 for the second gas removal pipe 2525, first electric lead wire 2535, second electric lead wire 2540, leak tight feedthroughs 2545 for first electrical lead wire 2535 and second electrical lead wire 2540.

Figure 26C:
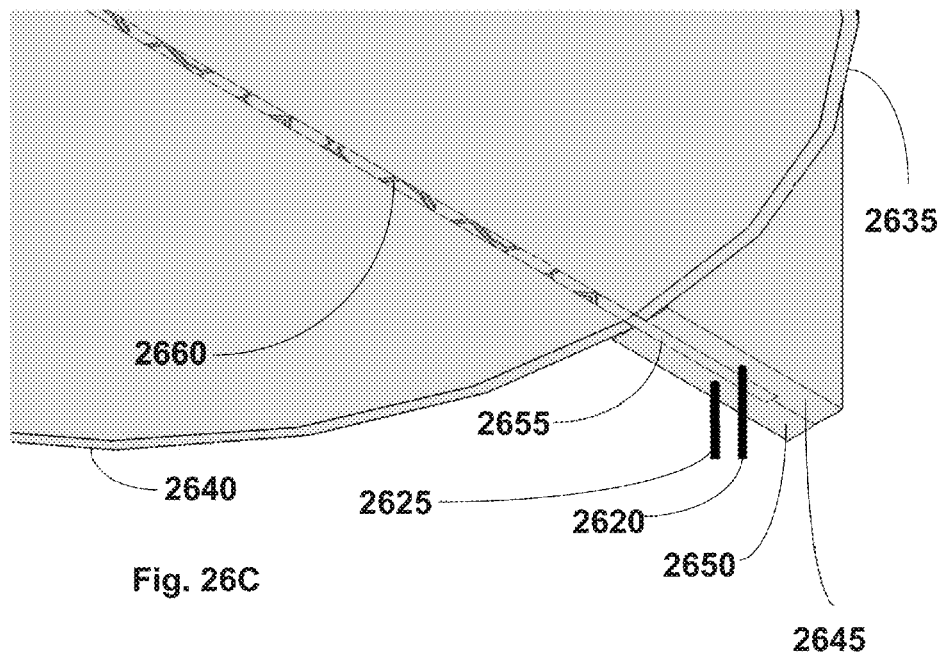
Figure 26D:
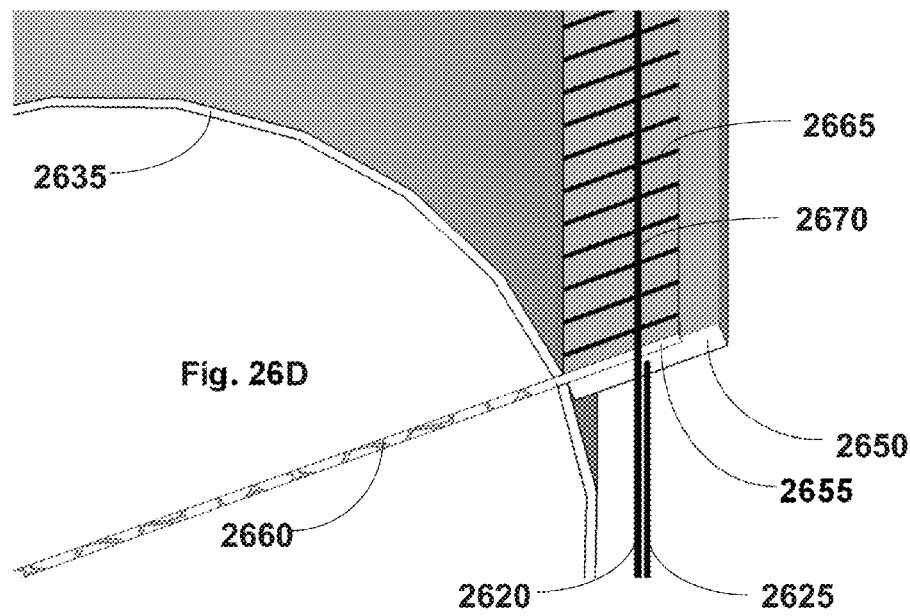

FIG. 26 shows several bottom perspective views of an embodiment of electrical contact with electrodes of an electrolysis apparatus in a water-containing vessel. FIG. 26A shows an embodiment of electrical contact leads 2620 and 2625 leak tight piercing a bottom plate 2615 of the water-containing vessel 2605 at location 2630. FIG. 26B shows an embodiment of a detailed view of FIG. 26A with the bottom plate 2615 removed and showing water 2610 that is contained in vessel 2605, first electric contact lead wire 2620 and second electric contact lead wire 2625. The electrolysis apparatus contained within the water-containing vessel 2605 is not visible in FIG. 26A or FIG. 26B. FIG. 26C shows an embodiment of a detailed bottom perspective view of the electrolysis apparatus that is in the water-containing vessel 2605 including first electric contact lead wire 2620, second electric contact lead wire 2625, first hemi-enclosure 2635, second hemi-enclosure 2640, first leak tight seal 2645, second leak tight seal 2650 and a strip 2655 that is impermeable to gas, water and ions that is fastened to diaphragm 2660. FIG. 26D further shows one or more electric contacts 2665 for one or more electrodes of a diaphragm electrode array and exposed wire 2670 that is prepared from insulated electric lead wire 2620 that makes electric contact with the one or more electric contacts 2665.

Figures 27A, 27B:
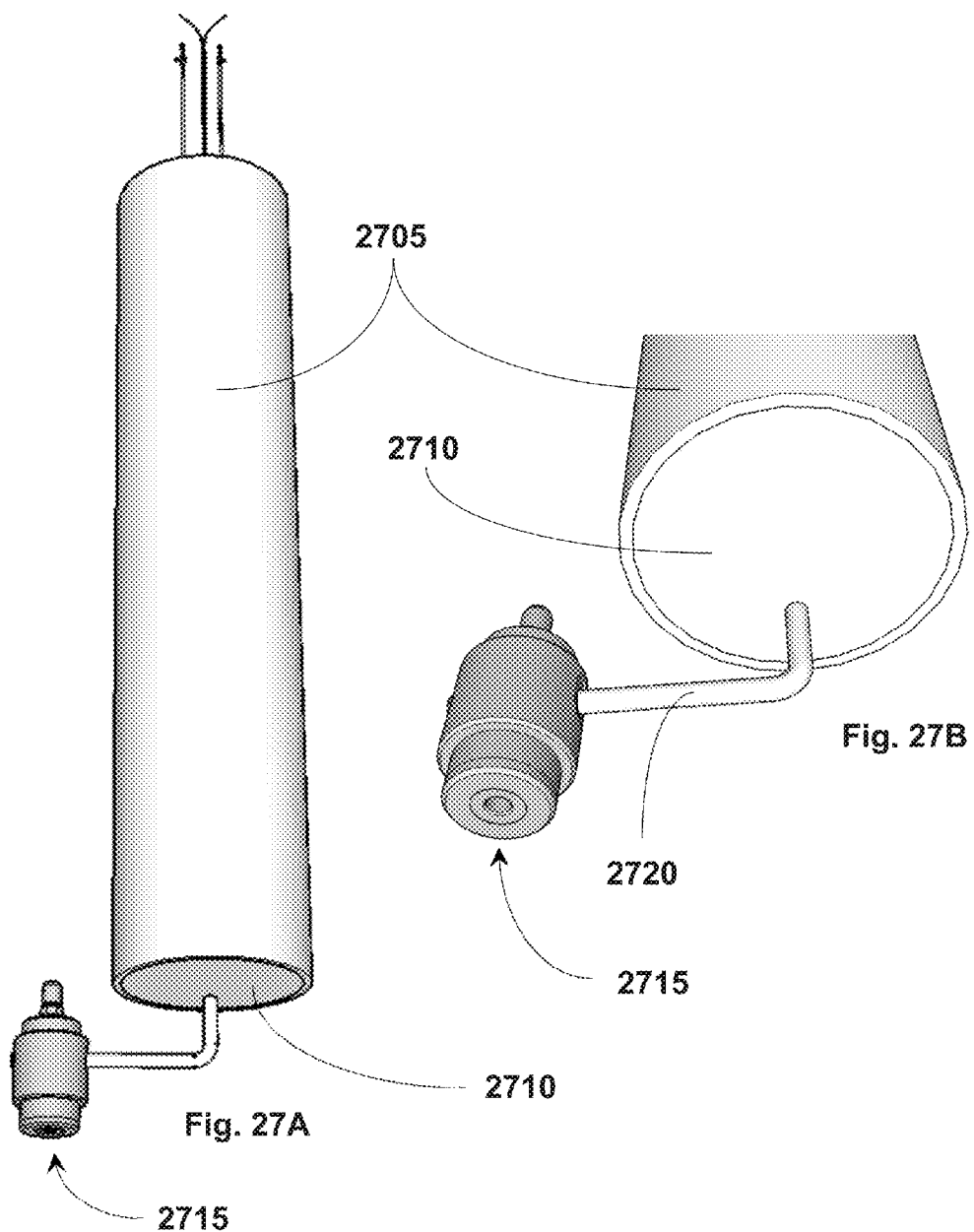
FIGS. 27A and 27B show perspective views of an embodiment of a compressor system transmitting pressure to water in a vessel.

FIG. 27A shows a bottom perspective view of an embodiment of a compressor system 2715 that is attached via a pipe to a water-containing vessel 2705 that contains a submerged electrolysis apparatus. FIG. 27B shows a detailed bottom view of FIG. 27A including vessel 2705, bottom plate 2710, compressor system 2715, and pressure transmitting pipe 2720.

FIG. 28 shows perspective views of the FIG. 27 embodiment with the water-containing vessel removed including water 2805 in the water containing vessel 2705, electrolysis apparatus 2810 that is submerged in water 2805 and compressor system 2815 that transmits pressure to water 2805 via pipe 2820.

FIG. 29 shows bottom perspective views of an embodiment of a compressor system communicating with the interior of an electrolysis apparatus 2905 including compressor system 2910 and pressure-transmitting pipe 2915 that connects the compressor system to the water in the electrolysis apparatus whereby the interior of the electrolysis apparatus is pressurized.

FIGS. 30A and 30B show top perspective views of an embodiment of compression of the interior of a water-containing vessel 3005 containing an electrolysis apparatus using force 3015 applied to piston 3010 in cylinder 3020 for pressure generation. Cylinder 3020 is configured to receive piston 3010. Cylinder 3020 is hydraulically coupled to the interior of the water containing vessel 3005 via tube 3025 whereby the water in the interior of vessel 3005 is pressurized which causes the interior of the electrolysis apparatus to be pressurized via one or more water permeable locations on the electrolysis apparatus.

Figures 31A, 31B:
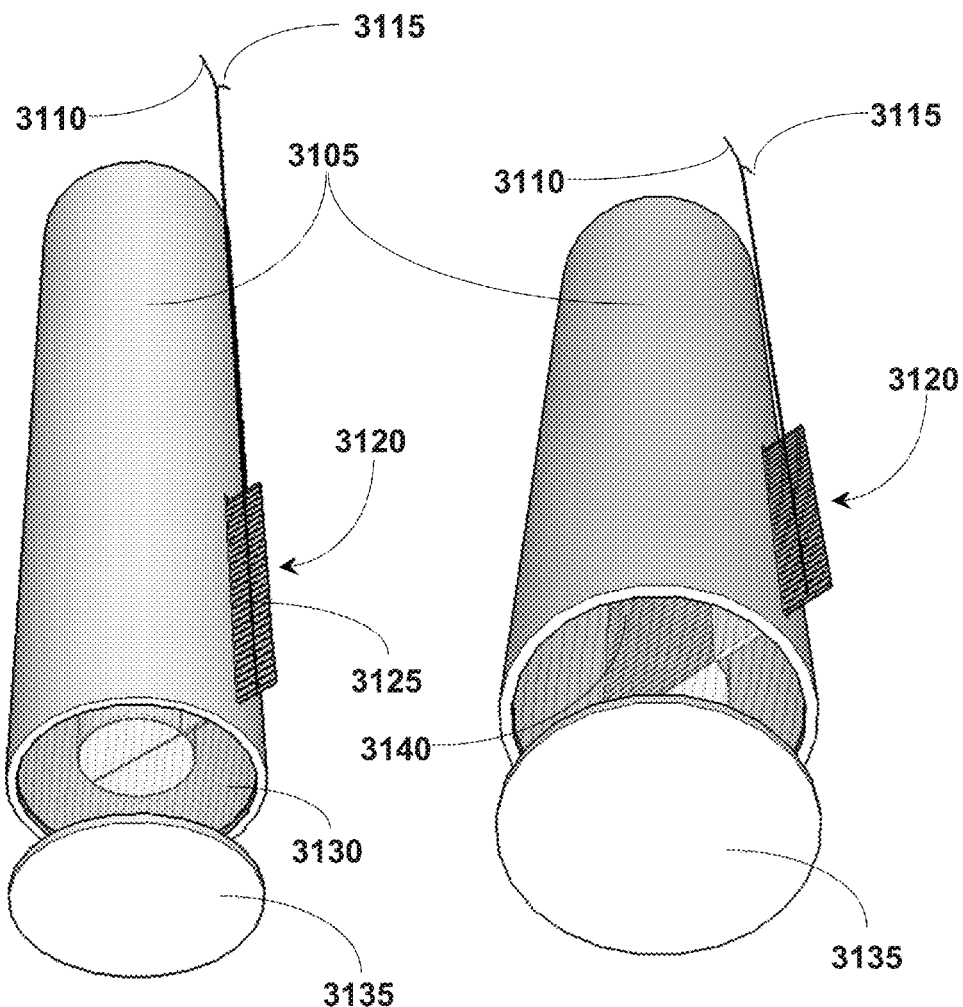
FIGS. 31A-31D show perspective views of an embodiment of an electrolysis apparatus in a water-containing vessel wherein electrical contacts for the electrodes extend beyond the water-containing vessel.
Figure 31C:
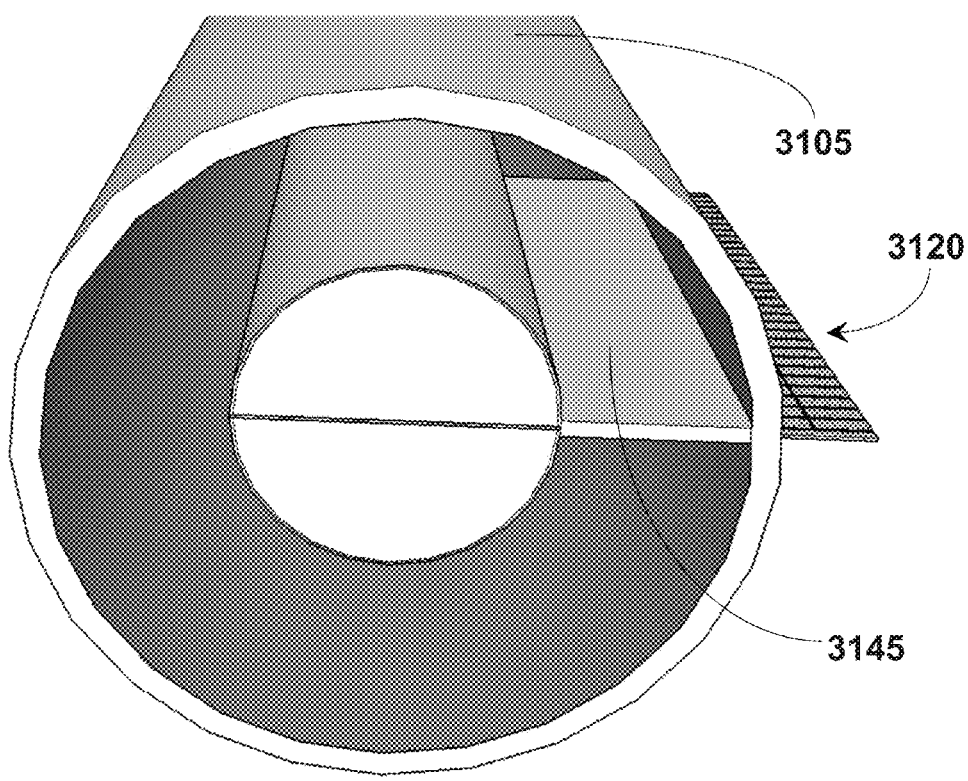

FIG. 31A shows a partially exploded bottom perspective view of an embodiment of an electrolysis apparatus in a water-containing vessel 3105 including one or more electrical contacts 3120, for one or more electrodes in a diaphragm electrode array of the electrolysis apparatus, that emerges from the water containing vessel 3105, first electric lead wire 3110, second electric lead wire 3115, exposed electric wire 3125 prepared by removing insulation from electric lead wire 3110 whereby electric contact with one or more electric contacts 3120 is made, water 3130 in the water-containing vessel and bottom plate 3135. FIG. 31B is similar to FIG. 31A except a first hemi-enclosure of the submerged apparatus is removed revealing electrodes 3140. FIG. 31C is a bottom perspective view with the bottom plate 3135 of the water-containing vessel removed showing water tight seals 3145 that seal the electrode contacts 3120 from the water in vessel

Figure 31D:
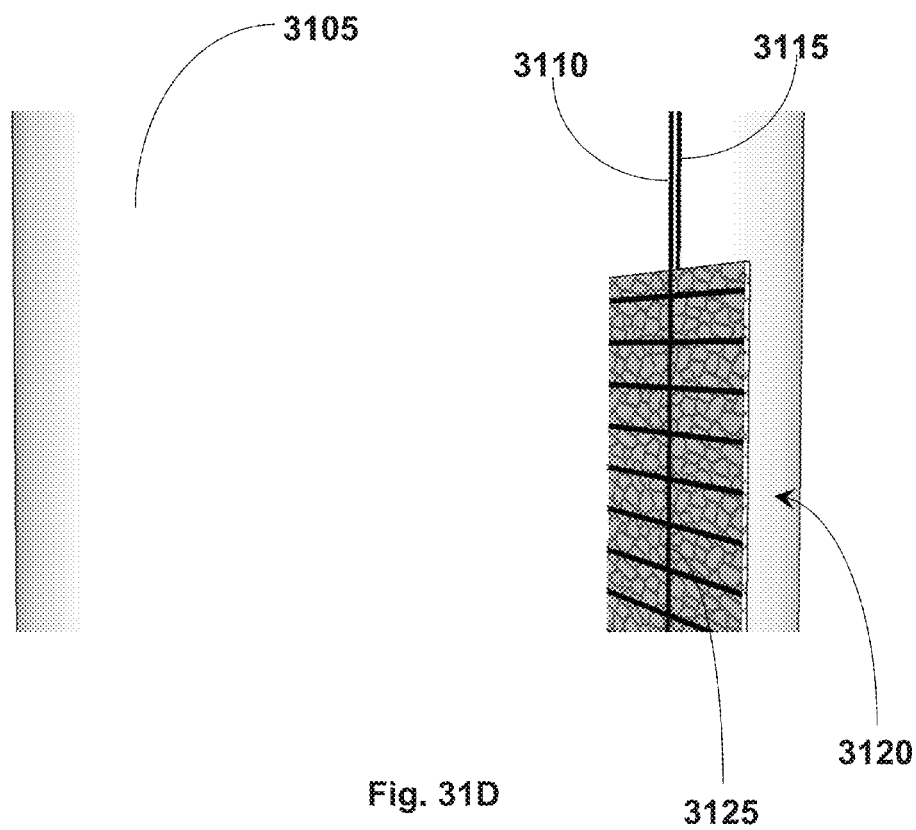

3105. FIG. 31D is a detailed view of the one or more electrode contacts 3120 that extend beyond the water containing vessel 3105.

Figure 32A:
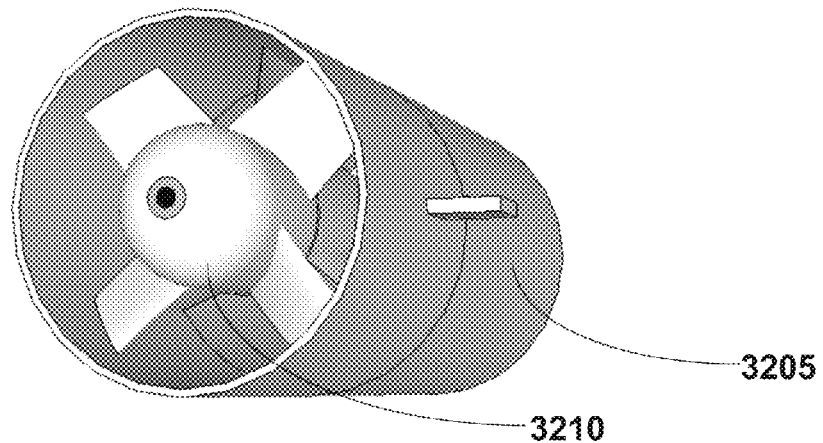
FIGS. 32A and 32B show an embodiment of an impeller and electric generator that are in line with one or more gas removal pipes of an embodiment of an electrolysis apparatus for converting kinetic energy of gas flow into electrical energy.
Figure 32B:
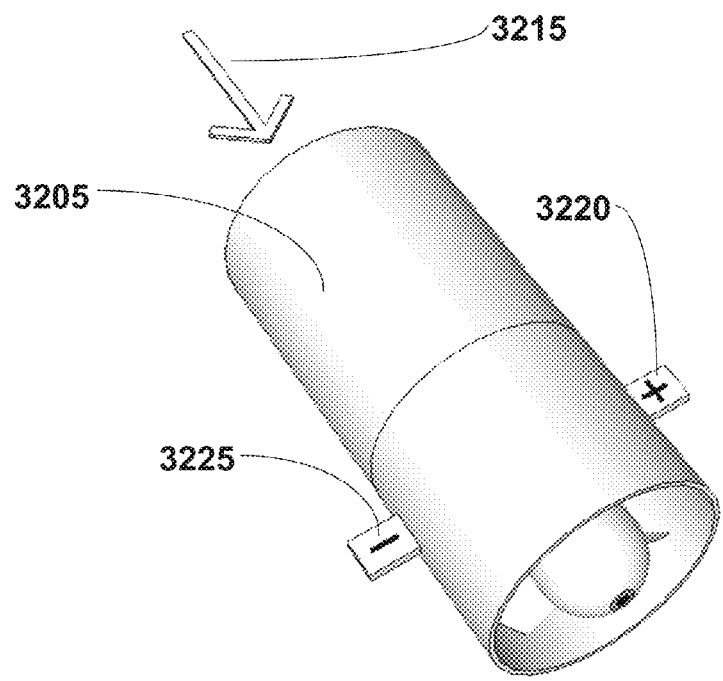

FIG. 32 shows an embodiment of an impeller and electric generator that are in line with one or more gas removal pipes of an electrolysis apparatus for converting kinetic energy of gas flow into electrical energy. FIG. 32A shows an embodiment of a gas removal pipe 3205 that sends the removed gas through impeller 3210 causing it to rotate. FIG. 32B includes arrow 3215 that represents the kinetic energy and momentum of the flowing gas in the gas removal pipe 3205 that is converted into electric energy by the rotating impeller-generator system and electrical outputs 3220 and 3225 of the generator The following provide additional examples of an electrolysis apparatus and possible variations

Example 1

With reference to FIGS. 1A-1D and 2A-2B, an electrolysis apparatus may include at least one back pressure regulator (120, FIGS. 1 and 205, FIG. 2) connected to a first compartment and at least one back pressure regulator (125, FIGS. 1 and 210, FIG. 2) connected to a second compartment. Both back pressure regulators may be set to cause the back pressures of gases in the first and the second compartments to be substantially equal. The back pressure regulators may be normally-closed valves that provide an obstruction to flow, but open when an upstream set pressure is reached. If the upstream set pressures are set to equal value, the pressures in the first and second compartments may be maintained at substantially equal values. The set pressures of the regulators can be controlled manually or electronically. Maintaining the pressures of the first and second compartments at equal values may improve the purity of the hydrogen and oxygen gases that are produced. This may be accomplished by minimizing gas crossover through the diaphragm. In some embodiments, the pressure of the first and second compartments may not be equal, for example, venting the oxygen to atmosphere while pressurizing the hydrogen stream. Unequal pressure between the first and second compartments, while still maintaining product purity, can be achieved by using PEM membranes in the electrolysis apparatus, for example.

Example 2

With reference to FIGS. 3A-3B, an electrolysis apparatus may include a first variable orifice valve 330 connected to a first compartment; a second variable orifice valve 335 connected to a second compartment; and a differential pressure gauge 305 that detects a difference between the pressure of gas in the first compartment and the pressure of gas in the second compartment and controls the first and the second variable orifices so as to substantially equalize the pressures of gases in the first and the second compartments. This embodiment of the apparatus may provide a second approach to improving the purity of the hydrogen and oxygen gases that are produced by the electrolysis apparatus by maintaining substantially equal pressures in the first and second compartments. In some embodiments, only one variable orifice valve may be needed to maintain equal pressure in the compartments. In some embodiments, communication between the differential pressure gauge and the variable orifice values may be performed electronically. In some embodiments, communication may be performed wirelessly. In some embodiments, the pressure of the first and second compartments may not be equal, for example venting the oxygen to atmosphere while pressurizing the hydrogen stream.

Example 3

With reference to FIGS. 4A and 4B, an electrolysis apparatus may include a back pressure regulator 405 that receives gas pressure data from a first compartment and uses the data to maintain the gas pressure in a second compartment equal to the gas pressure in the first compartment. The gas pressure in the first compartment may be set using a back pressure regulator 410. In some embodiments, the gas pressure data from the first compartment may be obtained by running a tube between the first compartment and the data input port 435 of back pressure regulator 405. In some embodiments, the gas pressure data from the first compartment may be obtained wirelessly. In some embodiments, the pressure of the first and second compartments may not be equal, for example venting the oxygen to atmosphere while pressurizing the hydrogen stream.

Example 4

In some embodiments, an electrolysis apparatus may include at least one location in the apparatus wherein external ions in fluid surrounding the apparatus can pass from the exterior of the apparatus into first and second compartments of the apparatus. In some embodiments, the at least one location may be between a first hemi-enclosure and a second hemi-enclosure. In some embodiments, the at least one location may be on a diaphragm. With reference to FIG. 5, an electrolysis apparatus may include a one-way valve 505 at the at least one location. A one-way valve may be a normally-closed valve that provides an obstruction to flow but opens when a pressure of the correct magnitude and direction 510 is reached. The presence of at least one location on the electrolysis apparatus wherein external ions in fluid surrounding the apparatus can pass from the exterior of the apparatus into the first and second compartments may provide an automatic water fill feature for the apparatus.

Example 5

With reference to FIGS. 6A-6D, an electrolysis apparatus may include substantially rectangular hemi-enclosures 605 and 610. In some applications, this embodiment of the electrolysis apparatus may have advantages with respect sealing and manufacturing technologies. Each hemi-enclosure may be machined from a single block whereby a hemi-enclosure that is comprised of continuous zone components may be fabricated. Fastening and sealing of the hemi-enclosures may be achieved using bolts, nuts, gaskets and clearance holes 620 wherein the clearance holes are drilled into the perimeter of the hemi-enclosures.

Example 6

With reference to FIGS. 7A-7B, some embodiments of an electrolysis apparatus may include a headspace barrier 705 that is fastened to a top edge 725 of a diaphragm electrode array 715. The headspace barrier 705 may contain a fill region 710 comprising a level of water in the electrolysis apparatus and a headspace above the water level. In combination with one or more back pressure regulators, the pressure of gas in the headspace above the water level may be increased. For example, if back pressure regulators in first and second compartments are set to 100 psi, applying electrical energy to one or more cathodes and anodes may produce hydrogen and oxygen in the cathode and anode compartments. The pressure in the respective compartments may rise until the set pressure is reached wherein the back pressure regulator opens and a stream of hydrogen gas and a stream of oxygen gas may vent from the electrolysis apparatus via respective hydrogen and oxygen gas removal tubes.

Example 7

With reference to FIGS. 8A-8C, in some embodiments of an electrolysis apparatus 800 a diaphragm 830 may have a perimeter edge and at least a portion of this perimeter edge may be fastened to a strip 805 that is impermeable to gas, water and ions. In some applications, this embodiment may provide advantages with respect to fluid-tight sealing of the electrode electrical contacts with the source of electrical power. The impermeable strip may prevent water from entering the sealed compartment. The sealed compartment may contain fluid tight feedthroughs whereby electrical power is provided to the electrodes in a dry fluid tight environment.

Example 8

With reference to FIGS. 11A-16B, in some embodiments an electrolysis apparatus may be partially or completely surrounded by water. In some embodiments, the water may be seawater. Water that is consumed during the electrolysis process may be replaced by the seawater by entering the apparatus through one or more locations on the apparatus that is permeable to water. In some embodiments, hydrogen and oxygen gases may be pressurized by submersion in deep water. For example, with reference to FIGS. 16A and 16B, if the apparatus is submerged to a depth of about 330 feet, the difference between levels 1625 and 1630, and electrical power is applied to cathode and anode electrodes, bubbles of gas may rise in and displace some of the overhead water. If back pressure regulators are set to about 150 psi, the gases in the headspace and gas removal tubes may be contained until the pressure, driven by the electrolysis reactions, exceeds the set pressure of the back pressure regulators, at which point streams of hydrogen gas and oxygen gas may vent from the apparatus via gas removal tubes.

Example 9

Some embodiments of an electrolysis apparatus may generate high pressure hydrogen and oxygen gases by placing an electrolysis apparatus comprising at least one location that is permeable to water in a sealed water-containing leak tight vessel and applying voltage to cathode and anode electrodes that are in cathode and anode compartments as shown in FIGS. 23-26, for example. Back pressure regulators may be included in gas removal pipes that receive gas from the cathode and anode compartments and may regulate the pressure of the gases in the compartments as shown in FIGS. 23-26, for example. In some embodiments of an apparatus for the electrolysis of water to hydrogen and oxygen, the interior of the vessel and the electrolysis apparatus may be pressurized by external compression systems that include supplying replacement water for water that is consumed by electrolysis shown in FIGS. 28, 29 and 30, for example. Some embodiments of external compressions systems include electrically powered compressors. Some embodiments of external compressions systems may include mechanical compression such as application of force to a piston in a cylinder. The external compressions systems may include water in tubes and reservoirs that supply replacement water to the apparatus for water that is consumed by electrolysis. Some embodiments of the apparatus may include electrical and mechanical feedback comprising communication pathways between the electrical and mechanical systems whereby cooperative interaction between the electrical and mechanical systems for regulating pressure and fluid levels is provided, for example. Some embodiments of the apparatus may include temperature and liquid level sensors that comprise communication pathways between the electrical and mechanical systems for regulating temperature, fluid and pressure levels in the apparatus, for example.

In some embodiments, the interior of the electrolysis apparatus may be pressurized by the height of water above the electrolysis apparatus in the vessel. In some embodiments, the interior of the electrolysis apparatus may be pressurized by the height of the water above the apparatus in the vessel plus the application of additional pressure by external devices such as compressor systems, hydraulic jacks or cylinder and piston systems in a manner roughly analogous to the operation of hyperbaric chambers. In some embodiments the interior of the electrolysis may pressurized substantially only by mechanical devices such as compressor systems, hydraulic jacks or cylinder and piston systems. Some embodiments the electrolysis apparatus comprise one or more fluid communication channels. Water consumed by electrolysis may be replaced by one or more pump systems and supply lines that penetrate the vessel and electrolysis apparatus. Several advantages may be realized among these embodiments. For example, large depths may not be required to achieve high hydrogen and oxygen gas pressures. The electrolytically produced hydrogen and oxygen may be generated at high pressure in relatively small vessels. The electrolysis apparatus may be comprised of relatively thin walls and readily available construction materials, since the pressure on both sides of the electrolysis apparatus may be substantially equal. These embodiments may shift the high pressure containment burden away from the electrolysis apparatus to the fluid tight vessel which can be made from standard high strength plastic or metal materials.

Example 10

With reference to FIGS. 31A-31D, in some embodiments of an electrolysis apparatus, electrode contacts 3120 emerge from a water containing compartment of a fluid tight vessel 3105 and are external to the vessel 3105. This embodiment may have the advantage of making electrical contact with the electrodes in a dry air environment. In some embodiments, the electrode contacts may emerge from water 3130 in a compartment of the fluid tight vessel 3105 and terminate in the wall of the vessel. In this embodiment, channels in the walls of the fluid tight vessel may carry the electric leads that are used to make contact with the electrodes and power the electrolysis apparatus. In some embodiments, the electric leads may include superconducting material.

Example 11

With reference to FIGS. 32A-32B, some embodiments of an electrolysis apparatus may include at least one impeller 3210 in at least one pipe 3205 that rotates when gas 3215 flows within the at least one pipe; and at least one electric generator that converts rotation of the impeller into electrical power with outputs at 3220 and 3225. This embodiment may have the advantage of improving the efficiency of the electrolysis by recovering some of the expended energy from the kinetic energy and momentum of the hydrogen and oxygen gases that are flowing in the gas removal pipes. For example, for equal volumetric flow velocities at equal pressure, approximately 80% of the kinetic energy and momentum of the flowing gases may be contained in an oxygen stream. If the oxygen is not needed as a byproduct of electrolysis, it can be vented to atmosphere through the impeller-generator system and a portion of the kinetic energy in the oxygen stream can be converted to electricity where it can be used for electrolysis.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. An electrolysis apparatus for splitting water into hydrogen and oxygen gases using electrolysis, the apparatus comprising:
a first hemi-enclosure having a facing edge;
a second hemi-enclosure having a facing edge that is separable from and not integral with the first hemi-enclosure;
a diaphragm that passes ions and impedes the passage of gas comprising a first side and a second opposing side, the diaphragm positioned between the facing edges of the first hemi-enclosure and the second hemi-enclosure, whereby the first hemi-enclosure and one side of the diaphragm form a first compartment and the second hemi-enclosure and the other side of the diaphragm form a second compartment;
one or more electrodes in the first compartment that emerge from the apparatus in a first interface defined by abutting edges of the first hemi-enclosure and the first side of the diaphragm to form one or more electrical contacts;
one or more electrodes in the second compartment that emerge from the apparatus in a second interface defined by abutting edges of the second hemi-enclosure and the second side of the diaphragm to form one or more electrical contacts;
a first pipe that allows gas within the first compartment to escape;
a second pipe that allows gas within the second compartment to escape;
a fastener that fastens the first hemi-enclosure, the diaphragm, the one or more electrodes, and the second hemi-enclosure together; and
electrical contacts that receive energy from an external source and deliver it to the electrodes.

2. The apparatus of claim 1 wherein the electrodes are wire electrodes.

3. The apparatus of claim 1 further comprising a headspace barrier that abuts an edge of the diaphragm and is impermeable to ions, gases and water.

4. The apparatus of claim 1 wherein the diaphragm has a perimeter edge and at least a portion of this perimeter edge is fastened to a strip that is impermeable to gas, water and ions.

5. The apparatus of claim 1 wherein the apparatus causes pressure of gas in the first compartment and pressure of the gas in the second compartment to be substantially equal.

6. The apparatus of claim 5 further comprising at least one back pressure regulator connected to the first compartment and at least one back pressure regulator connected to the second compartment, both back pressure regulators being set to cause the back pressures of gases in the first and the second compartments to be substantially equal.

7. The apparatus of claim 5 further comprising:
a first variable orifice valve connected to the first compartment;
a second variable orifice valve connected to the second compartment; and
a differential pressure gauge that detects a difference between the pressure of gas in the first compartment and the pressure of gas in the second compartment and controls the first and the second variable orifices so as to substantially equalize the pressures of gases in the first and the second compartments.

8. The apparatus of claim 5 further comprising a back pressure regulator that receives gas pressure data from the first compartment and uses the data to maintain the gas pressure in the second compartment equal to the gas pressure in the first compartment.

9. The apparatus of claim 1, further comprising at least one location on a surface of the apparatus through which external ions in fluid surrounding the apparatus can pass from the exterior of the apparatus into the first and second compartments.

10. The apparatus of claim 9 wherein the at least one location is between the first hemi-enclosure and the second hemi-enclosure.

11. The apparatus of claim 10 wherein the at least one location is on the diaphragm.

12. The apparatus of claim 9 further comprising a one-way valve at the at least one location.

13. The apparatus of claim 9 further comprising:
an electrical conductor passing from the outside to the inside of the first fluid-tight compartment in a leak tight manner and in electrical contact with the one or more electrodes in the first compartment; and
an electrical conductor passing from the outside to the inside of the second fluid-tight compartment in a leak tight manner and in electrical contact with the one or more electrodes in the second compartment.

14. The apparatus of claim 9 further comprising a fluid containing vessel that substantially surrounds the fastened together first hemi-enclosure, diaphragm, electrodes, and second hemi-enclosure.

15. The apparatus of claim 14 further comprising a pressure-transmitting tube passing between the outside and inside of the fluid containing vessel.

16. The apparatus of claim 14 wherein the electrodes that emerge from the electrolysis apparatus also emerge from the vessel and wherein the apparatus further comprises:
a first electrode compartment oxygen gas removal pipe that channels oxygen gas formed within the first electrode compartment outside of the vessel and that prevents the oxygen from entering the area of the vessel that surrounds the hemi-enclosures; and
a second electrode compartment hydrogen gas removal pipe that channels hydrogen gas formed within the second compartment outside of the vessel,
wherein the apparatus prevents:
liquid from escaping the first or the second electrode compartments, and
mixing of the oxygen gas and the hydrogen gas.

17. An apparatus for the production of hydrogen and oxygen from water, the apparatus comprising:
an electrolysis apparatus comprising:
at least one first electrode inside of a first electrode compartment;
at least one second electrode inside of a second electrode compartment;
a diaphragm that passes ions and impedes the passage of gas positioned between the at least one first electrode and the at least one second electrode and that forms a common barrier of the first and second electrode compartments;
a leak tight vessel completely surrounding the electrolysis apparatus that is capable of holding fluid in an interior region that completely surrounds the first electrode compartment and the second electrode compartment in a leak tight manner;
one or more fluid communication channels between an interior region of the vessel and the insides of the first and second electrode compartments;
a first electrode compartment oxygen gas removal pipe that channels oxygen gas formed within the first electrode compartment outside of the vessel and prevents the oxygen gas from entering the area of the vessel that surrounds the electrolysis apparatus; and
a second electrode compartment hydrogen gas removal pipe that channels hydrogen gas formed within the second compartment outside of the vessel,
wherein the apparatus prevents:
liquid from escaping the first or the second electrode compartments, and mixing of the oxygen gas and the hydrogen gas;
a first electrical conductor that conducts electricity from outside of the vessel to the at least one first electrode;
a second electrical conductor that conducts electricity from outside of the vessel to the at least one second electrode.

18. The apparatus of claim 17 further comprising at least one back pressure regulator that causes the pressures in the first and second compartments to be equal.

19. The apparatus of claim 17 wherein the first and the second gas removal pipes run from within the electrolysis apparatus into the vessel.

20. The apparatus of claim 17 wherein the first and second gas removal pipes extend outside of the vessel.

21. The apparatus of claim 17, wherein:
the at least one first electrode includes multiple first electrodes;
the at least one second electrode includes multiple second electrodes;
the multiple first electrodes emerge from the electrolysis apparatus and penetrate the vessel to form multiple first electrode contacts external to the vessel; and
the multiple second electrodes emerge from the electrolysis apparatus and penetrate the vessel to form multiple second electrode contacts external to the vessel.

22. The apparatus of claim 17 wherein that apparatus has a configuration that causes gas in the first and second gas removal pipes to be substantially free of liquid.

23. The apparatus of claim 17 further comprising a fluid-conducting tube that permits fluid outside of the vessel to be transmitted into an interior region of the vessel and, in turn, into the electrode compartments.

* * * * *